Aug. 31, 1965 E. F. KLEINSCHMIDT ETAL 3,204,028

COMMUNICATIONS EQUIPMENT PRINTER

Original Filed Nov. 16, 1955 23 Sheets-Sheet 1

INVENTORS
Edward F. Kleinschmidt
John W. Ehrlich
Edward E. Podwojski

BY Strauch, Nolan & Neale
Attorneys

Aug. 31, 1965 E. F. KLEINSCHMIDT ETAL 3,204,028

COMMUNICATIONS EQUIPMENT PRINTER

Original Filed Nov. 16, 1955 23 Sheets-Sheet 2

INVENTORS
Edward F. Kleinschmidt
John W. Ehrlich
BY Edward E. Podwojski
Strauch, Nolan & Neale
Attorneys Aug. 31, 1965 E. F. KLEINSCHMIDT ETAL 3,204,028

COMMUNICATIONS EQUIPMENT PRINTER

Original Filed Nov. 16, 1955 23 Sheets-Sheet 3

INVENTORS
Edward F Kleinschmidt
John W. Ehrlich
Edward E. Podwojski

BY Strauch, Nolan + Neale
Attorneys

Aug. 31, 1965 E. F. KLEINSCHMIDT ET AL 3,204,028

COMMUNICATIONS EQUIPMENT PRINTER

Original Filed Nov. 16, 1955 23 Sheets-Sheet 4

INVENTORS
Edward F. Kleinschmidt
John W. Ehrlich
Edward E. Podwojski

BY Strauch, Nolan & Neale
Attorneys

INVENTORS
Edward F. Kleinschmidt
John W. Ehrlich
Edward E. Podwojski
BY
[signature]
Attorneys Aug. 31, 1965 E. F. KLEINSCHMIDT ETAL 3,204,028

COMMUNICATIONS EQUIPMENT PRINTER

Original Filed Nov. 16, 1955 23 Sheets-Sheet 6

INVENTORS

BY Edward F. Kleinschmidt
John W. Ehrlich
Edward E. Podwojski

Strauch, Nolan + Neale Attorneys

INVENTORS
Edward F. Kleinschmidt
John W. Ehrlich
Edward E. Podwojski

BY Strauch, Nolan + Neale Attorneys

INVENTOR.
Edward F. Kleinschmidt
BY John W. Ehrlich
Edward E. Podwojski

Strauch, Nolan & Neale Attorneys

Aug. 31, 1965 E. F. KLEINSCHMIDT ETAL 3,204,028

COMMUNICATIONS EQUIPMENT PRINTER

Original Filed Nov. 16, 1955 23 Sheets-Sheet 9

INVENTORS
Edward F Kleinschmidt
John W. Ehrlich
Edward E. Podwojski
BY
Strauch, Nolan & Neale
Attorneys

COMMUNICATIONS EQUIPMENT PRINTER

INVENTORS
Edward F. Kleinschmidt
John W. Ehrlich
Edward E. Podwojski

BY Strauch, Nolan & Neale
Attorneys

INVENTORS
Edward F Kleinschmidt
John W. Ehrlich
Edward E. Podwojski
BY
Strauch, Nolan + Neale
Attorneys Aug. 31, 1965 E. F. KLEINSCHMIDT ETAL 3,204,028

COMMUNICATIONS EQUIPMENT PRINTER

Original Filed Nov. 16, 1955 23 Sheets-Sheet 12

INVENTORS
Edward F. Kleinschmidt
John W. Ehrlich
Edward E. Podwojski

Brauch, Nolan + Neale
Attorneys

COMMUNICATIONS EQUIPMENT PRINTER

Original Filed Nov. 16, 1955 23 Sheets-Sheet 13

INVENTORS
Edward F. Kleinschmidt
John W. Ehrlich
Edward E. Podwojski
Staub, Nolan & Neale
Attorneys INVENTORS
Edward F. Kleinschmidt
John W. Ehrlich
Edward E. Podwojski
BY
[signature]
Attorneys INVENTORS
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski

BY

Attorneys

COMMUNICATIONS EQUIPMENT PRINTER

Original Filed Nov. 16, 1955 23 Sheets-Sheet 17

INVENTOR.
Edward F. Kleinschmidt
John W. Ehrlich
Edward E. Podwojski

BY Strauch, Nolan & Neale
Attorneys

Aug. 31, 1965 E. F. KLEINSCHMIDT ETAL 3,204,028

COMMUNICATIONS EQUIPMENT PRINTER

Original Filed Nov. 16, 1955 23 Sheets-Sheet 18

INVENTORS
Edward F. Kleinschmidt
John W. Ehrlich
Edward E. Podwojski

BY Strauch, Nolan & Neale
Attorneys

COMMUNICATIONS EQUIPMENT PRINTER

Original Filed Nov. 16, 1955

23 Sheets-Sheet 19

INVENTORS
Edward F. Kleinschmidt
John W. Ehrlich
Edward E. Podwojski

BY [signature]
Attorneys

COMMUNICATIONS EQUIPMENT PRINTER

Original Filed Nov. 16, 1955 23 Sheets-Sheet 20

INVENTOR.
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski
BY
Strauch, Nolan & Neale
Attorneys INVENTORS
Edward F. Kleinschmidt
John W. Ehrlich
Edward E. Podwojski

BY

Strauch, Nolan + Neale
Attorneys

COMMUNICATIONS EQUIPMENT PRINTER

Original Filed Nov. 16, 1955 23 Sheets-Sheet 23

INVENTORS
Edward F. Kleinschmidt
John W. Ehrlich
Edward E. Podwojski
BY
Strauch, Nolan & Neale
Attorneys

United States Patent Office 3,204,028
Patented Aug. 31, 1965

3,204,028
COMMUNICATIONS EQUIPMENT PRINTER

Edward F. Kleinschmidt, Wilmette, and John W. Ehrlich, Glenview, Ill., and Edward E. Podwojski, Santa Barbara, Calif., assignors to SCM Corporation, New York, N.Y., a corporation of New York Original application Nov. 16, 1955, Ser. No. 547,265, now Patent No. 3,009,988, dated Nov. 21, 1961. Divided and this application July 26, 1961, Ser. No. 127,037
21 Claims. (Cl. 178—32)

The present invention relates to improvements in message communication equipment of the type that is operative to produce a legible record of messages transmitted and recorded and particularly to improvements in the receiving printer of such equipment rendering it lighter in weight, more compact in construction, and otherwise adapted for use in aircraft. This application is a division of co-pending application Serial No. 547,265, filed November 16, 1955, for Communication Equipment.

Heretofore communication equipment of this type has been generally unsuitable for use in aircraft due to its overall weight and bulk and due to its structural arrangement by which the units, such as the keyboard and printing units, which of necessity must be located in positions accessible to the operator, were themselves large and bulky and inseparably associated with other bulky components of the overall equipment constant access to which was not needed by the operator resulting in crowding of the operator's compartment unnecessarily and in certain types of aircraft rendering the equipment unusable due to lack of the requisite space requirements in the operator's compartment. For these reasons, use of equipment of this type has been largely confined to large shipboard and ground installations.

The advantages of equipment of this type, in which a page printer provides a constant monitor of a selected radio communication channel without operator attendance and also an accurate record of all messages transmitted and received, have heretofore been largely denied to aircraft communications.

In addition to the foregoing difficulties with the prior equipment of this type, there are additional functional limitations which render such prior equipment unsuitable for aircraft use, particularly for military and naval aircraft.

An electro-mechanical printer is included as a component of the present invention in functional cooperation with a matrix segment of the control circuit, to receive, convert and legibly record coded signals received by the transmitter-receiver unit or initiated from the unit keyboard. The particular type of legible recording apparatus used is known in the printing telegraph field as a typewheel page printer.

Prior art devices for receiving conventional coded signals of the typewheel page printer form are normally composed of a typewheel; relatively complex mechanism for moving the typewheel into a selected character printing or space position; an inking device for the typewheel which may be a movable ribbon; and a carrier for the page upon which the message is to be printed. Major portions of such prior art operating mechanisms, e.g., the typewheel, inking device or ribbon, and positioning mechanisms have been located for movement in front of the page upon which the message is to be printed with the disadvantageous result that the copy cannot be completely read as it is printed. Furthermore, such heretofore known printing telegraph devices have been of a relatively complex nature with a multiplicity of mechanical parts which necessarily require repeated adjustments and servicing and whose additive weight results in a heavy unit. Furthermore, the inking device must be constantly checked to assure clean sharp representation of the figures of the message and ink consistency varied with temperature changes, frequently encountered in aircraft.

The printer in the present invention provides, with its control matrix, a new and novel telegraph receiver of the page printing type wherein the only portion of the operating mechanism located in front of the page upon which the message is to be printed is a printing hammer, although the mechanism can be modified to be used with an ink ribbon if so desired, e.g., the ribbon can be carried by the hammer mechanism. The preferred embodiment utilizes commercially available special black surfaced paper, the black surface being treated with a light colored material. When the hammer strikes the surface material and forces the paper against the selected character of the typewheel located immediately behind the paper in line with the hammer, the portion of the treated material over the raised letter on the typewheel is broken, leaving a visual substantially black manifestation of the raised character. This manner of visual character recording is unaffected by temperature variations.

The novel printing apparatus per se of the invention comprises a typewheel which is letter spaced across the page by a cable wound on a spacing drum. The cable, attached through a bearing collar on the typewheel, is selectively shiftable by positive incremental rotation of the cable drum, which enables successive spacing of the typewheel. The positive rotation of the spacing drum winds and stores power in a clock type spring inside the drum, which is utilized for the typewheel return movement. A narrow printing hammer is mounted for spacing in front of the page in synchronism with the spacing of the typewheel. Through a novel system of pulleys the spacing cable is utilized to laterally shift the print hammer, as well as the typewheel, in direct synchronization with the typewheel. When a selected character is to be printed the hammer which is positioned and normally held in a forwardly spaced relation away from the page is impelled toward the typewheel to compress the page therebetween and inscribe the selected character on the front of the page.

All operating mechanisms for actuating and controlling the action of print hammer and typewheel are mounted on the sides, in the back or at the bottom of the printed page so as not to obstruct a view of the page when the message is being printed. The print hammer, although located directly in front of the page has a normal position which, because of the design of the printer, mounting arrangement of the hammer and rapidity of motion of the hammer, never appears to be in position obstructing any part of the line of printed matter which therefore will always be completely visible.

The typewheel character selection is accomplished through a novel extremely lightweight controlled stop mechanism coordinated with the shaft upon which the typewheel is fixed. This includes a toothed stop wheel rotatable with the typewheel shaft having a plurality of stop positions determined by the engagement of a solenoid controlled pawl with individual stop wheel teeth. The stop mechanism uses two such solenoid controlled pawls so positioned around the periphery of the stop wheel that one pawl will engage and stop the stop wheel at a position intermediate the positions at which the other pawl engages and stops the stop wheel. Thus the number of angular selections of typewheel rotation can be controlled by energization of one of the two solenoids at selected rotational positions of the typewheel shaft. Energization of the solenoids at precise positions of shaft rotation is accomplished through printed commutator circuits disposed adjacent each end of the typewheel shaft, each commutator circuit controlling one solenoid and, through its associated pawl, one half of the characters on the typewheel. Through a receiving matrix in the control circuit, one or the other of the commutators will control its respective solenoid for each code combination fed into the circuit. Use of the electrical selecting mechanism rather than a mechanical permutating code member selecting mechanism contributes in a large manner to the light weight of this printer.

One important aspect of this invention is in the use of a matched toothed wheel on the typewheel shaft coordinated with the toothed stop wheel and used to positively pivot the stop pawls into a stop position ahead of a tooth on the stop wheel. If the solenoid for that pawl is not then energized, the pawl is spring biased away from its stop position before the stop tooth engages the pawl. This procedure repeats for each tooth of the stop wheel and occurs for each pawl. Thus the pawls are positively positioned by typewheel shaft rotation and when a stop solenoid is energized, it does not have to actuate the pawl but merely holds it in its stop position, eliminating the mechanical delay of inertia that would be present in a pawl actuating solenoid.

The roll of page material is located on the rear side of the printer unit and feeds down behind, under and up in front of the typewheel shaft and typewheel and up over a feed roller. Through a new power mechanism which includes a novel positive action clutch driving a function shaft which in turn, through a friction clutch, drives the typewheel shaft, the apparatus can initiate line return or line feed movements at any spaced position of the typewheel, and the line return function may be so controlled to simultaneously initiate a line feed function or initiate only a line return function.

A further component of this complete set, at least in a broad sense, is the keyboard which in general form is similar to a standard teletypewriter keyboard although specifically modified in several of the mechanisms. The keyboard may be used selectively to control the transmission of messages or to control the storage of message signals for future transmission, a printed record being made of the message in either event. Although, if necessary, the keyboard can be arranged to accommodate a larger number of character representations, the preferred and disclosed embodiment is arranged for transmission of signals indicative of the twenty-six characters of the alphabet, plus line return, line feed, letters and space.

Signal devices are included as components of the keyboard unit to enable the operator to visually determine several limit conditions of the complete set, i.e., the approach of the end condition of the magnetic tape in the tape recorder and the approach of the end of line position on the page printer. These signal devices are lamps which when illuminated indicate the above two conditions. Although the page printer of this set will automatically initiate line return and line feed, the operator, using proper sending technique, should send a line return and line feed signal at the end of each line, hence the need for an indicator to inform the operator when such position is being approached. In a conventional manner this transmitter utilizes five notched code bars actuated by the transmitter keys. Depending on the character key depressed, the five code bars are moved into a predetermined permutation, each bar moving either to the right or left side. Each code bar is associated with a pair of contacts and, when moved to the right, the bar will cause its set of contacts to close, conversely when moving to the left the bar will cause the contacts to be opened. Closed contacts represent mark impulses and open contacts represent space impulses. Thus each key will operate the code bars to provide a particular combination of five signals represented by the condition of the five code bar switches. The keyboard prepares the contacts for a simultaneous five unit signal combination that is fed through five separate line circuits to the main control unit circuit.

Immediately behind or parallel with the five code bars is a universal bar that always shifts in one direction whenever a key or the space bar is depressed and enables a code bar locking wedge to be biased into locking cooperation with the five code bars and the universal bar. Movement of the locking wedge into locking position prevents a resetting of the code bars and closes a sixth set of contacts. This action occurs each time a key is depressed, except as hereinafter described for repeat blocking. Due to a built-in mechanical time delay, the code bar contacts are completely set before the universal bar contact circuit is energized through actuation of the sixth set of contacts by the locking wedge. This enables the five unit code combination to be completely integrated into the control circuit before the control circuit electronic matrix is operated to transmit the code signal. The universal bar wedge actuated contacts initiate the control circuit operation to transmit the code signal in the manner desired and determined by the operator. Such control circuit operation, subsequent to code transmission, actuates a code bar locking wedge solenoid to release the locking wedge and enable the next key to be depressed which reshifts the code bars and universal bar to repeat the transmitting operation.

Incorporated on the universal bar is a novel repeat blocking device that cooperates with the locking wedge to prevent the wedge from relocking if any key is held in a depressed position which positively retains the universal bar in its shifted position. If the locking wedge cannot move to locking position its contacts cannot be closed and the control circuit will be inoperative for the combination of signal impulses represented by the code bar contacts. Release of the depressed key will permit the universal bar to shift back to its normal position and the repeat blocking device becomes inoperative.

Repeat blocking is inoperative upon space bar operation because the space bar has its own transmitter operating contacts in a circuit parallel to those of the wedge actuated contacts. If the space bar is depressed and held down the transmitter will repeat the combination of signals representing a space until the space bar is released.

Also included as part of the airborne teletypewriter apparatus is a novel recorder unit in which messages to be transmitted may be stored and then transmitted at a subsequent time. The recorder unit according to the invention is adapted to be located at a remote position in the aircraft to conserve space around the operator and is completely unattended at all times. In view of the intended operational environmental conditions, the recorder unit according to the present invention is provided with a minimum number of parts, has minimum weight and is ruggedly constructed to be capable of operation even when subjected to large acceleration forces.

With the foregoing discussion in mind, the principal objects of the present invention directly related to the printer unit are:

(1) To provide an improved lightweight printer utilizing a selecting circuit including a printer operated commutator;

(2) To provide communication equipment embodying a typewheel form of page printer, and a control arrangement therefor operative in response to the successive alternative application of simultaneous signals to a channel of each of a plurality of pairs of channels and constituting a succession of coded signal groups of a message to successively position said typewheel in accordance with the significance of the coded signal group to record a message;

(3) To provide a printer in which the type carrier and hammer are so positioned relative to the recording medium with no inking device being necessary, and in which the recorded message can be read as soon as the recording of each character is completed;

(4) To provide in a page printer a novel system for synchronizing a typewheel and printing hammer mounted for traversing movement relative to the page wherein a message is printed on a page disposed between the type carriage and hammer;

(5) To provide a novel page printer having positive selection of character representation accomplished through a selecting shaft commutator which energizes a solenoid controlled selector shaft stop device;

(6) To provide novel printer commutator circuits disposed at either end of a typewheel selecting shaft for use in positive selection of the rotatable typewheel position;

(7) To provide a page printer having a letter spacing printing hammer together with novel means for blocking the printing hammer in response to function signals being received, and;

(8) To provide a power train of a telegraph printer with a novel high speed controlled positive clutch having a predetermined increment of rotation.

These and other objects of the present invention will become more fully apparent by reference to the appended claims and as the following detailed disclosure proceeds with reference to the accompanying drawings wherein:

Figure 5A:
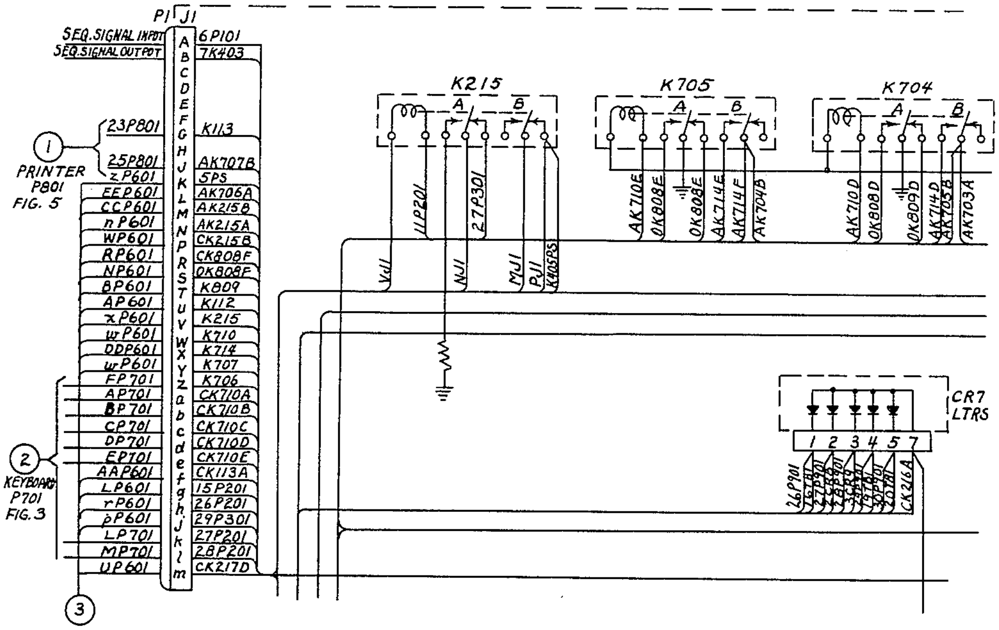
Figure 5:
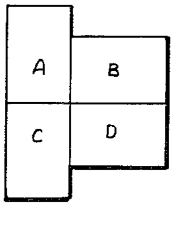
Figure 6:
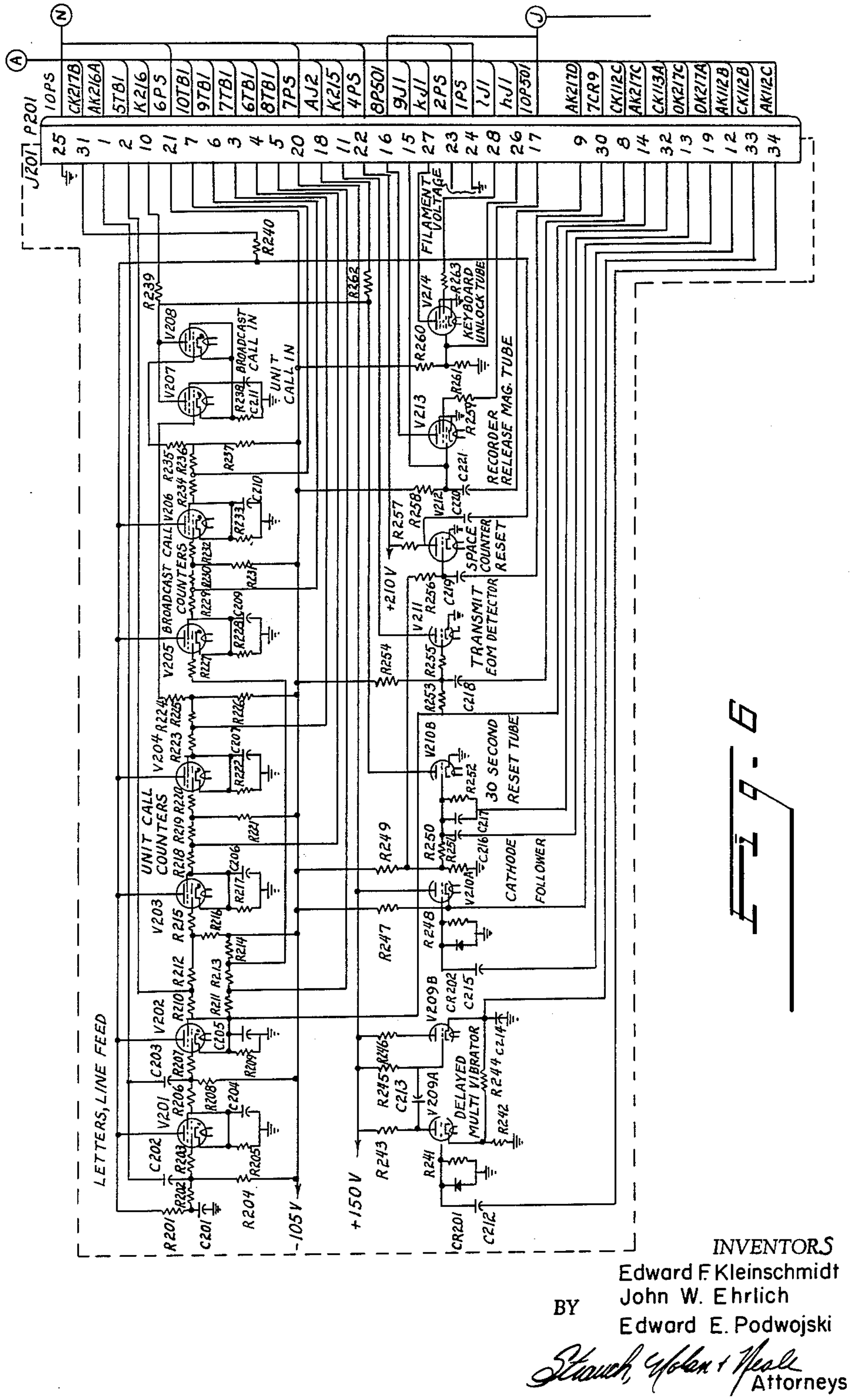
Figure 7:
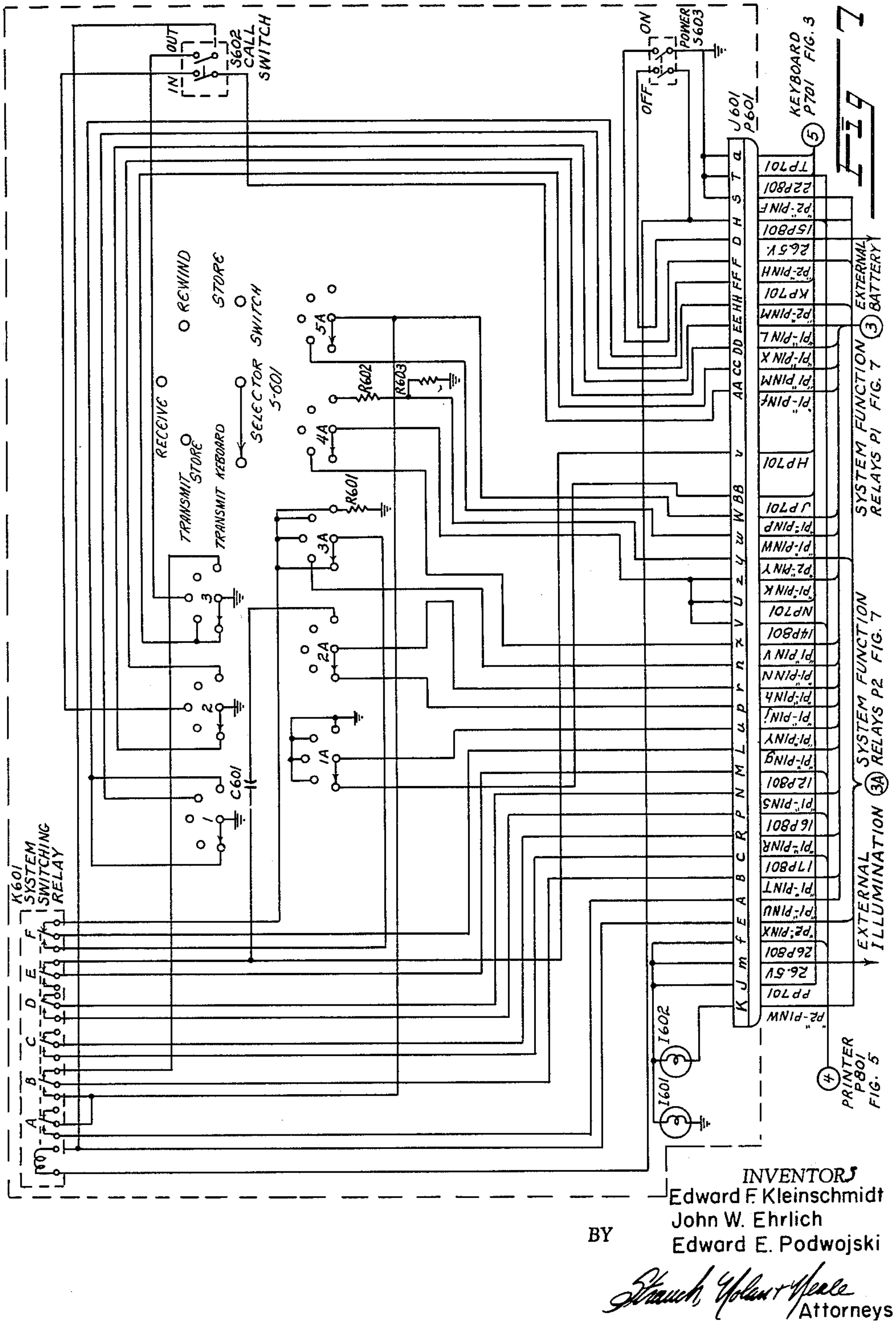
Figure 8:
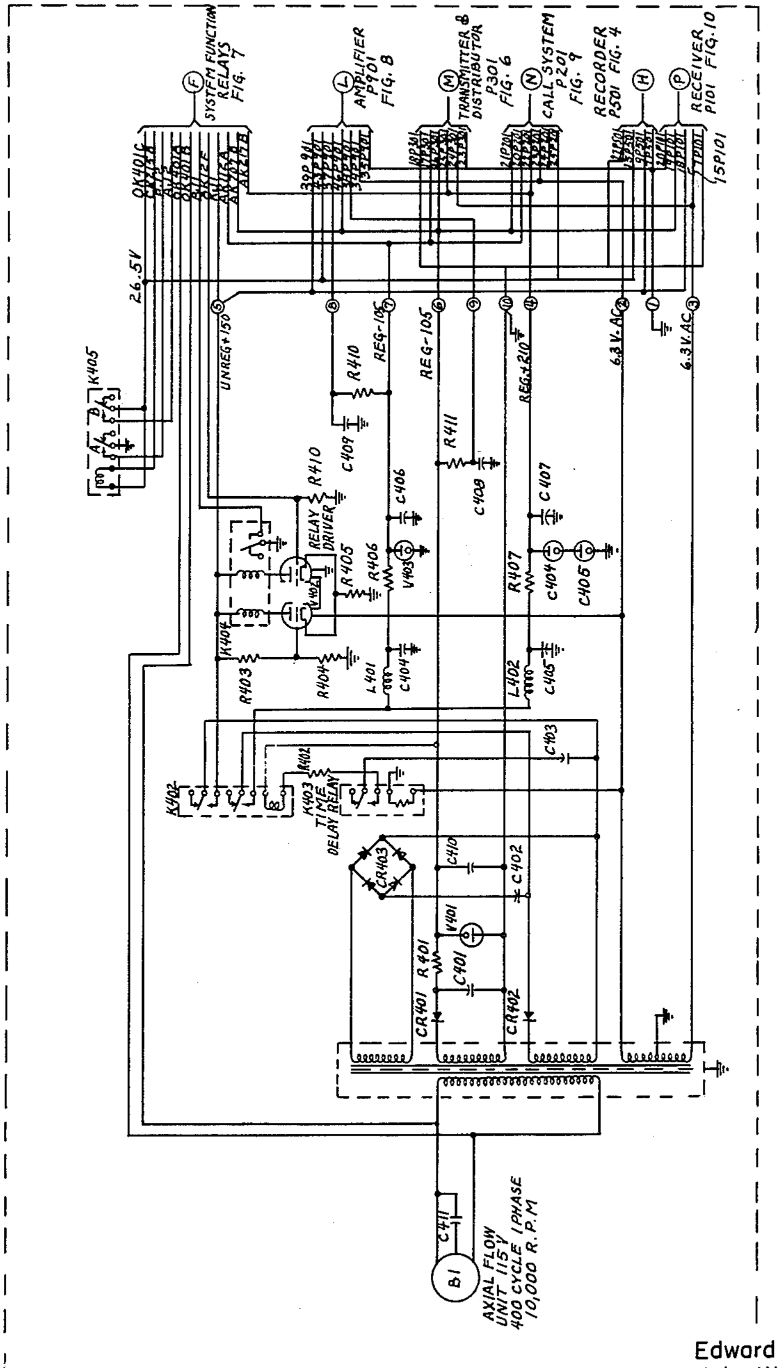
Figure 9:
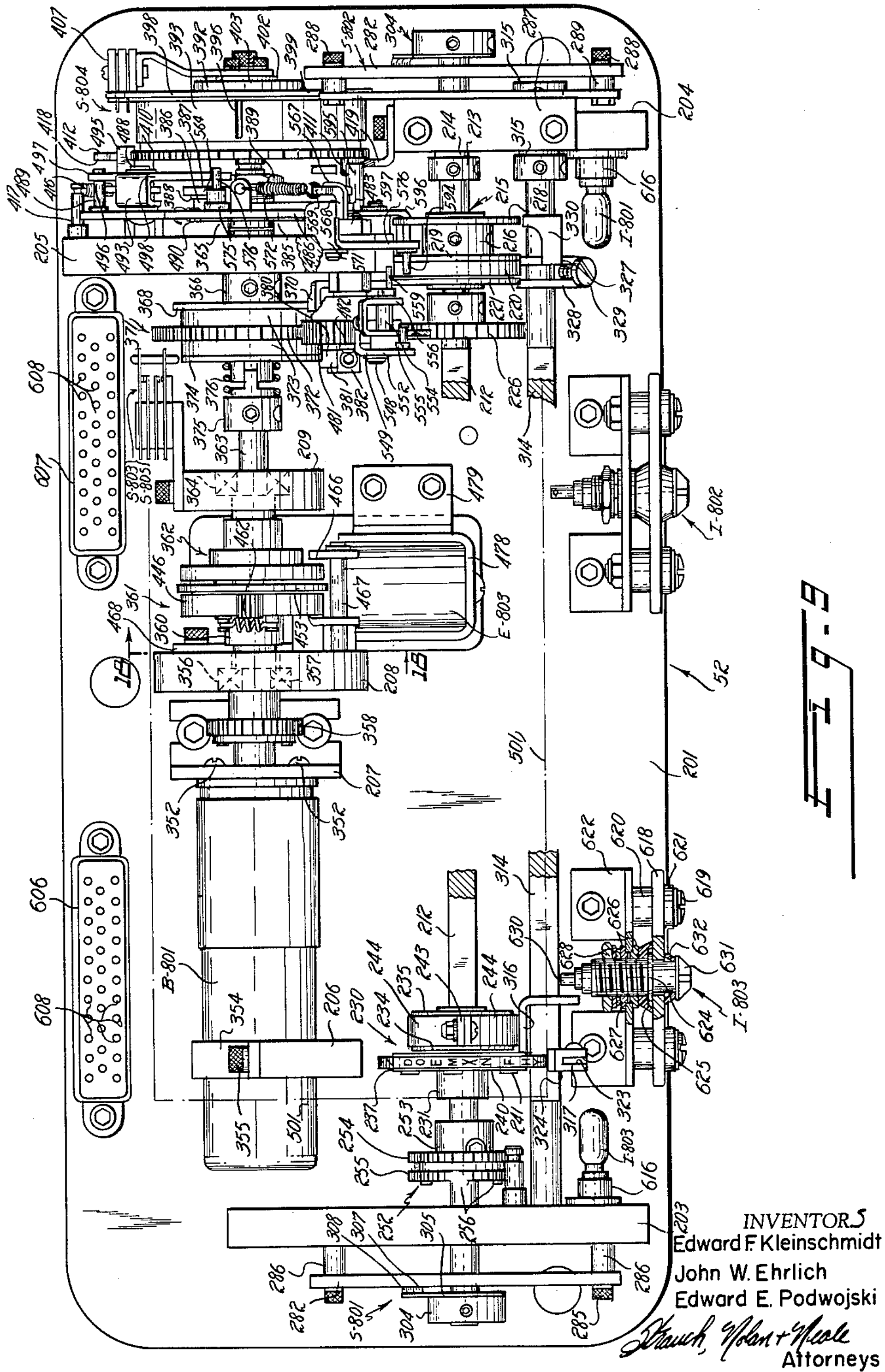
Figure 10:
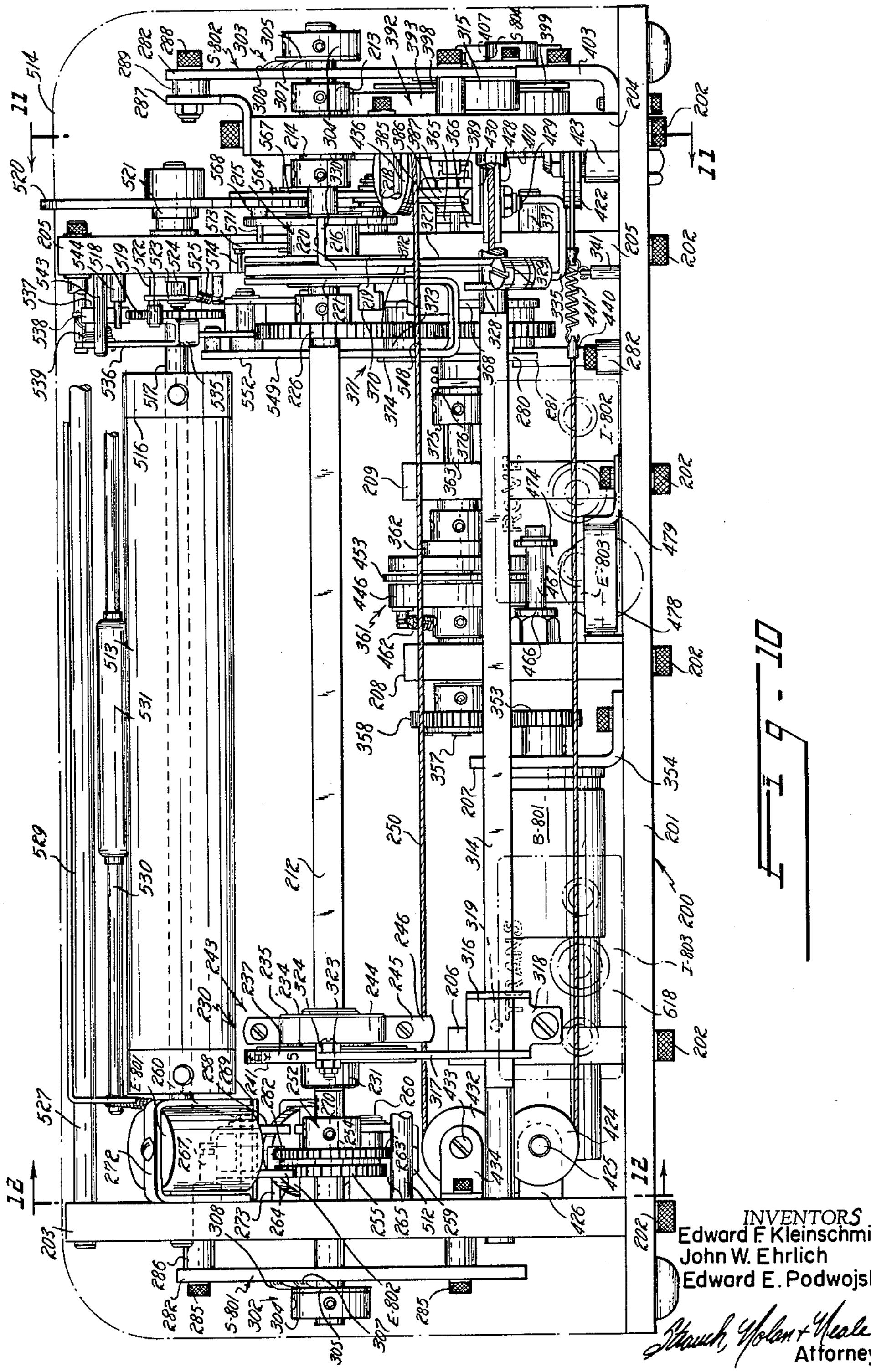
Figures 11, 12:
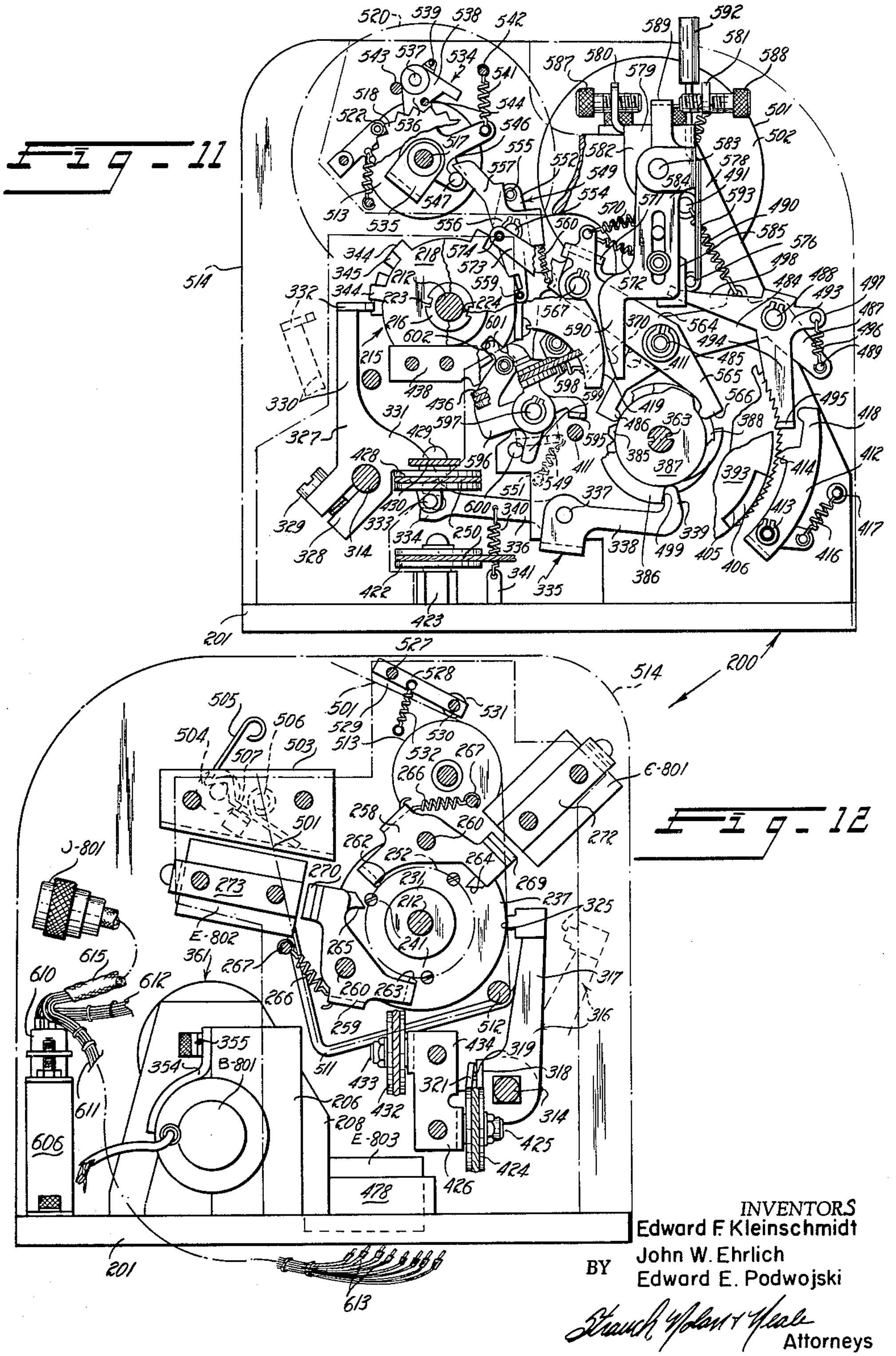
Figures 13, 22:
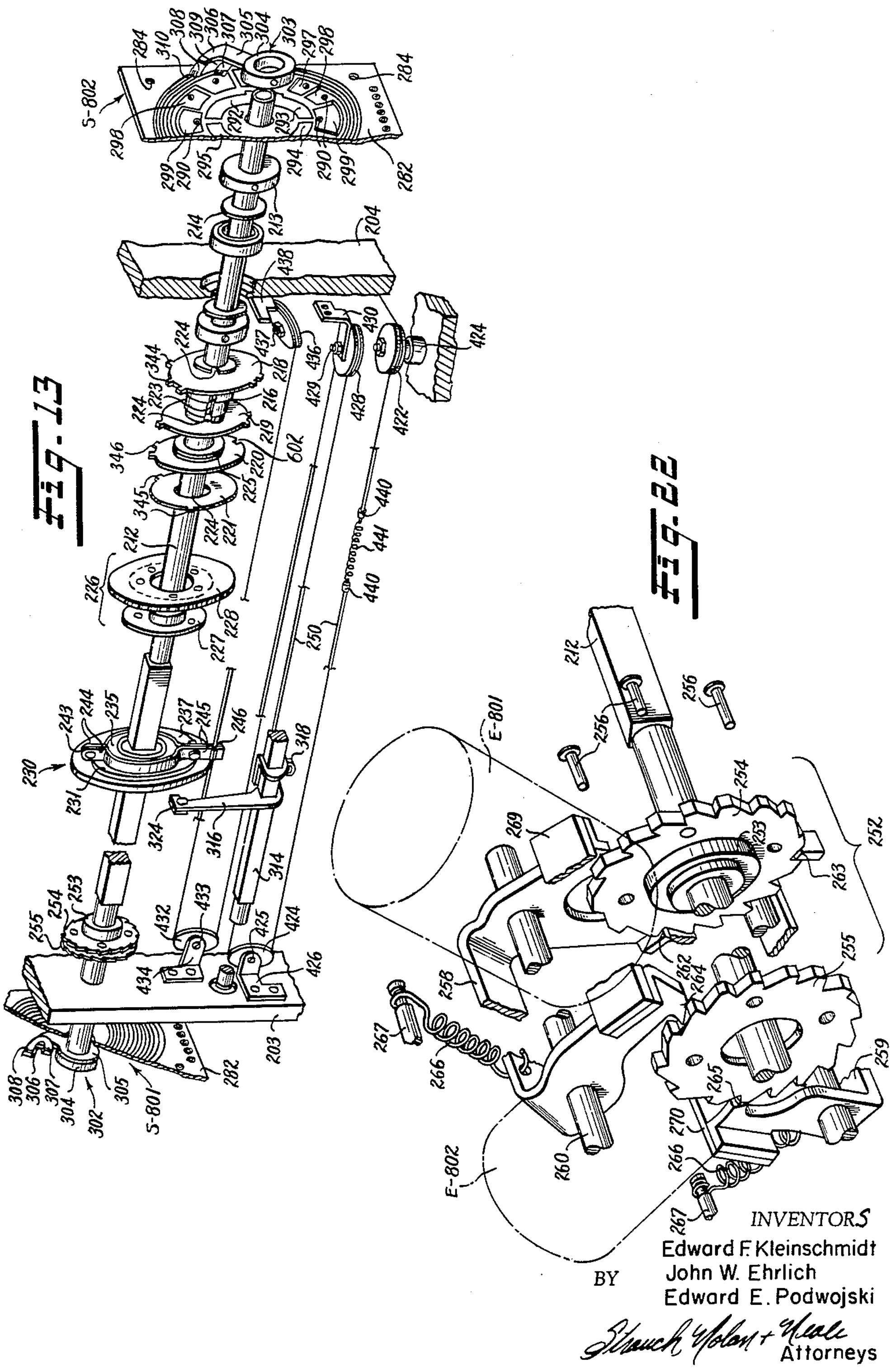
Figure 14:
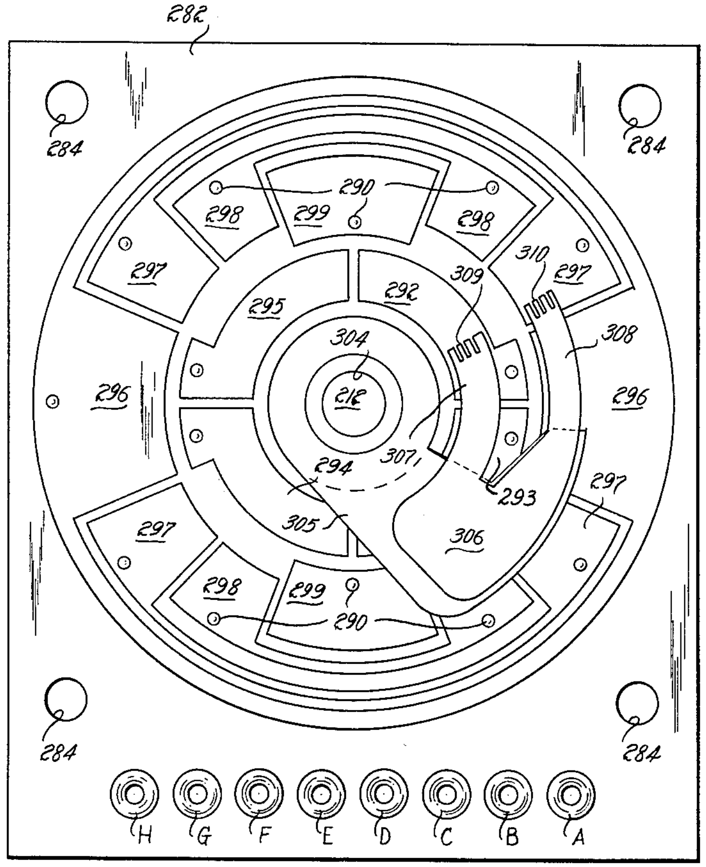
Figure 15:
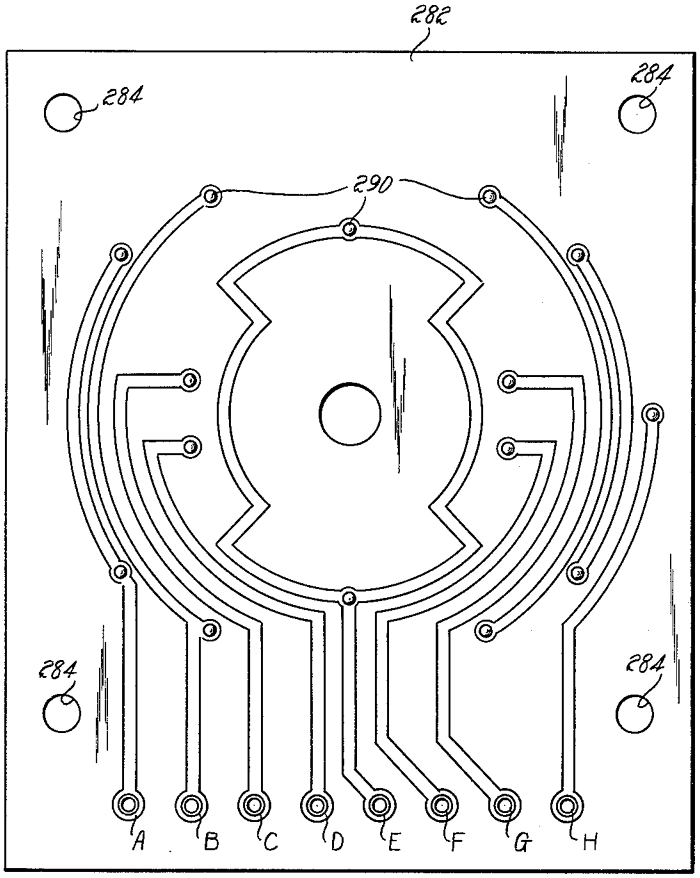
Figure 16:
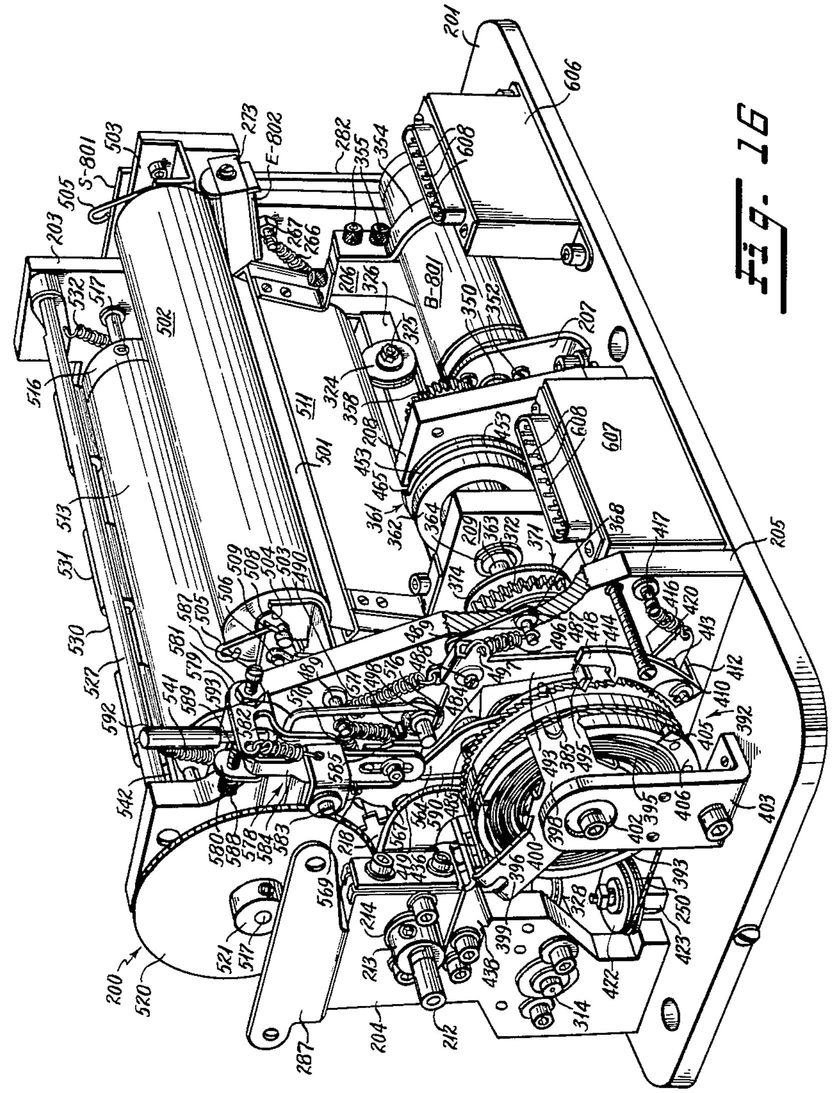
Figure 17:
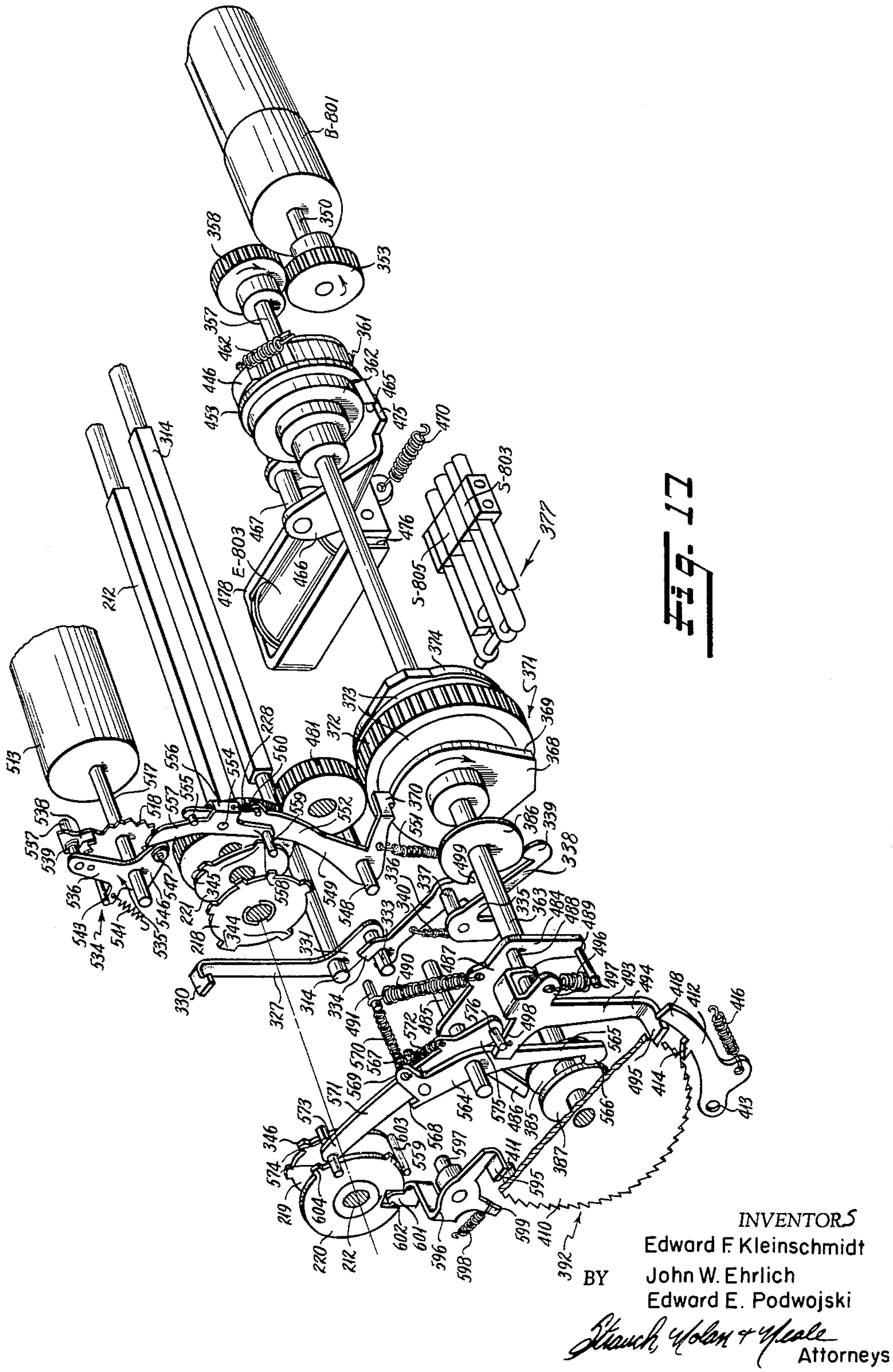
Figure 18:
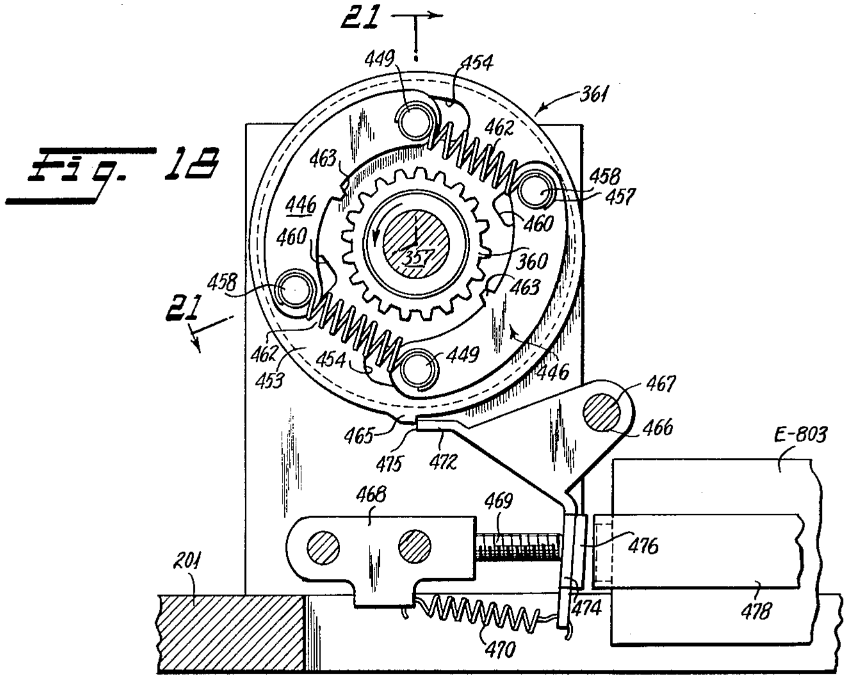
Figures 19, 20:
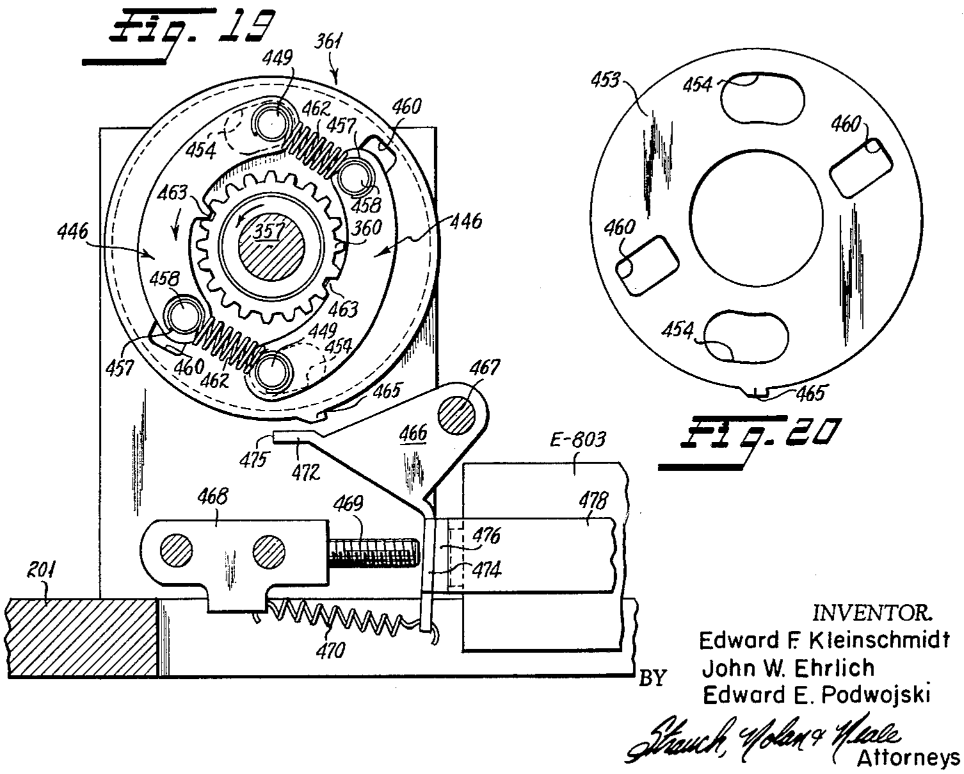
Figure 21:
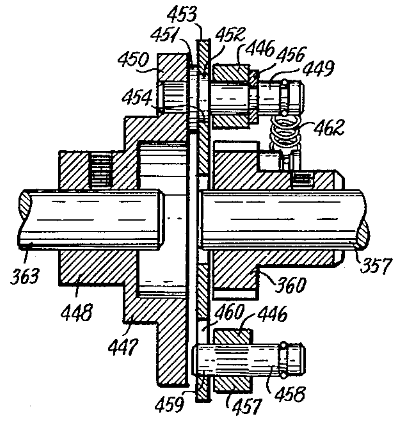
Figure 23:
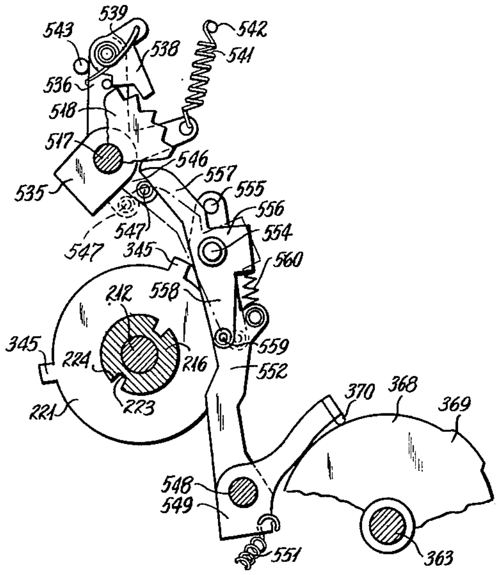
Figure 24:
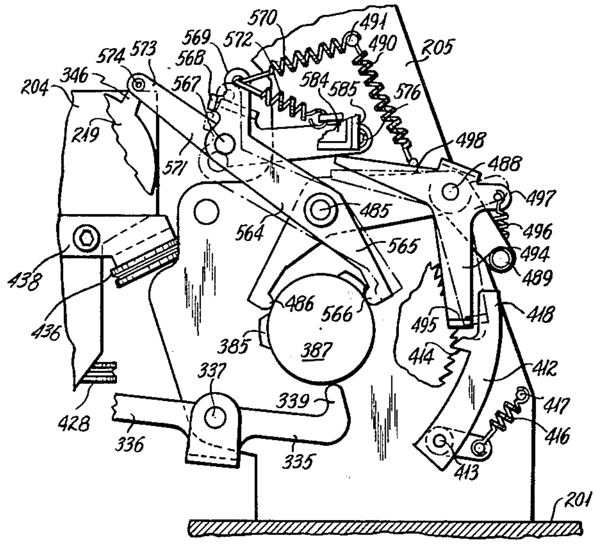
Figure 25:
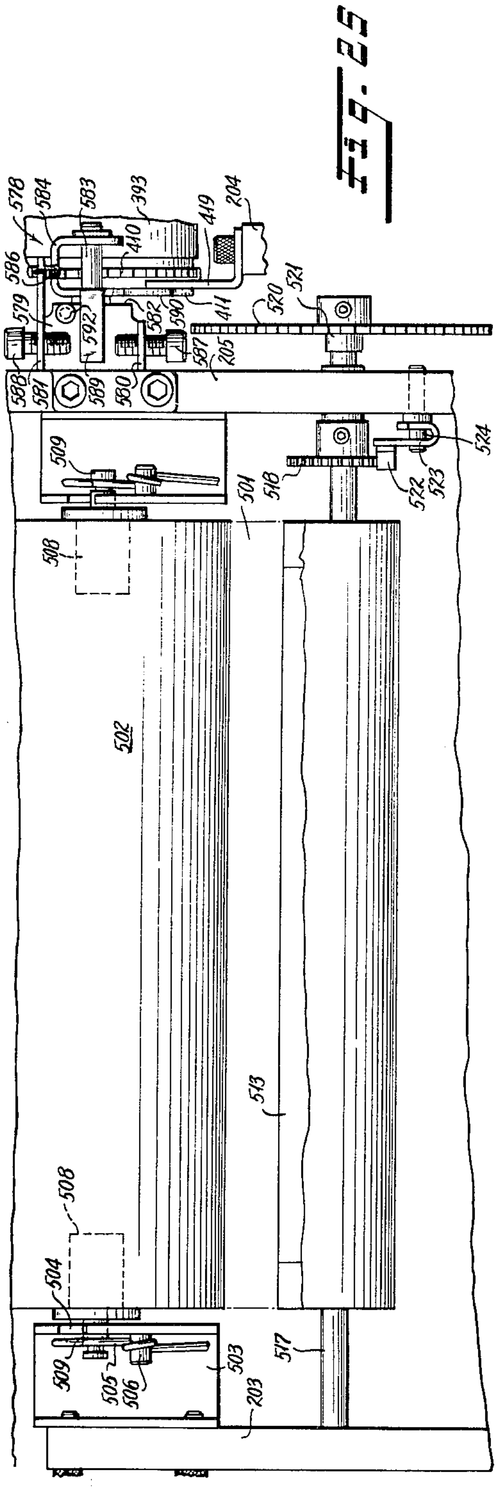
Figure 26:
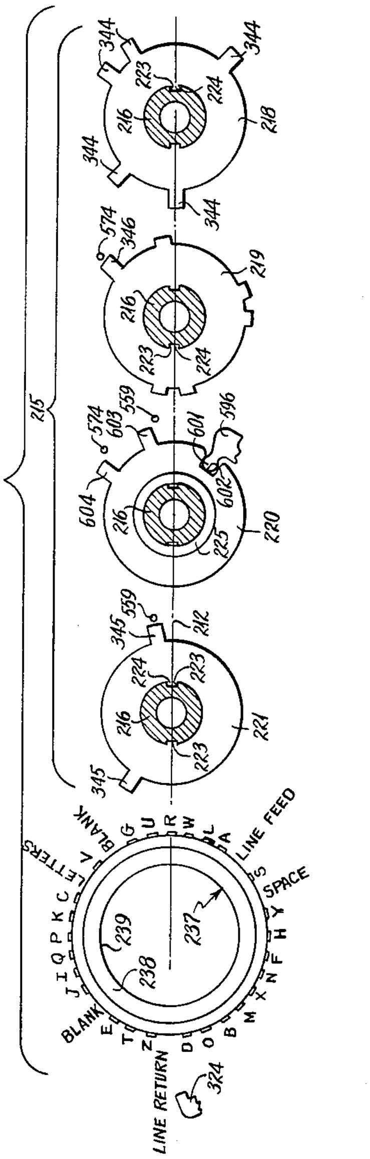
Figure 27:
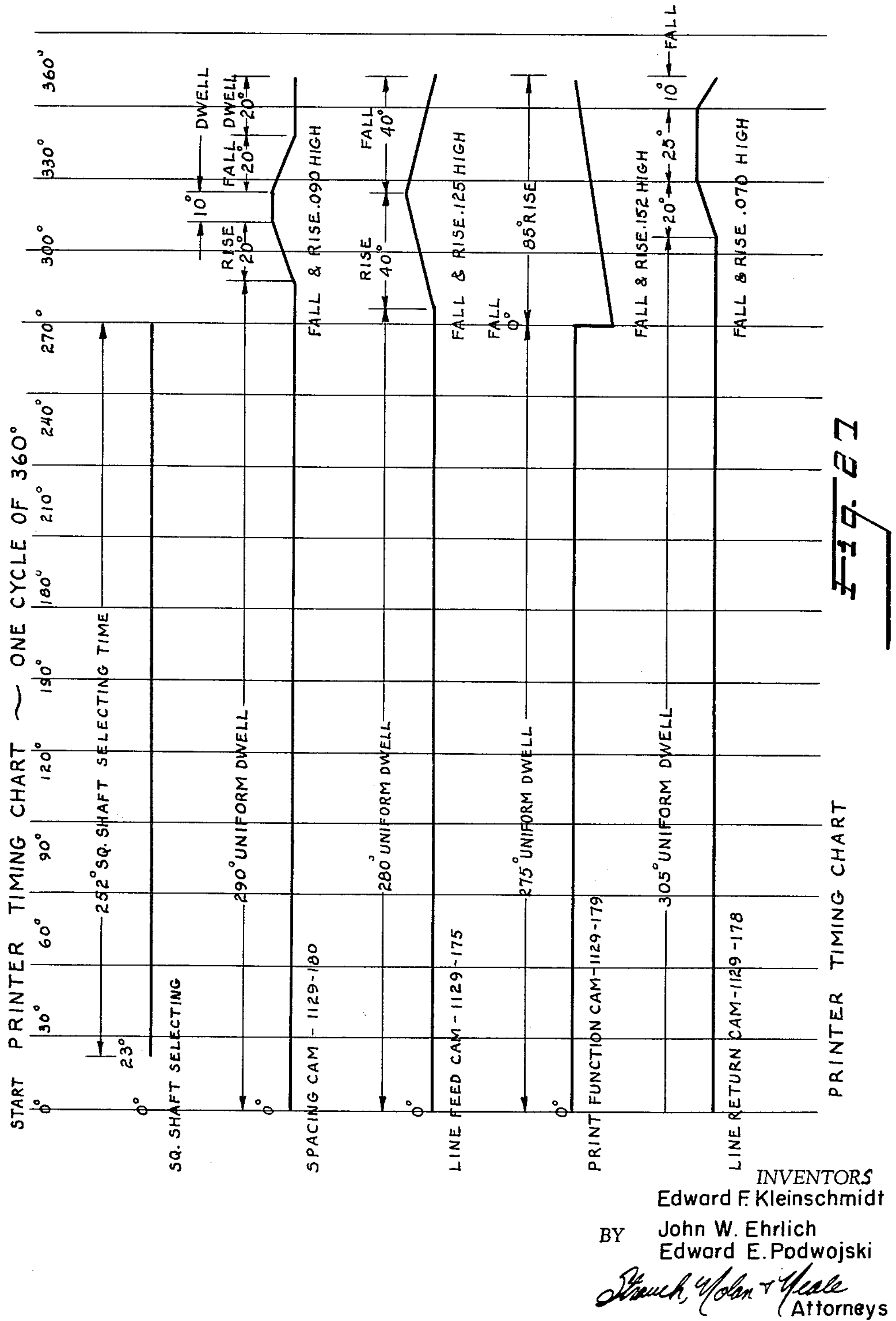

FIGURES 5, *5a*, *5b* and *5c* when arranged as shown in FIGURE 5 from a schematic diagram of the system function relay circuit;

FIGURE 6 is a schematic diagram of the call system circuits;

FIGURE 7 is a schematic diagram of the control box circuits;

FIGURE 8 is a schematic diagram of the power supply;

FIGURE 9 is a top plan view of the printing unit with the cover, page roll support and guiding structure and the stop solenoids and pawls removed;

FIGURE 10 is a front elevation view of the printing unit shown in FIGURE 9, showing the print hammer, the slidable type wheel, a portion of the cable and pulley system, and the solenoid controlled stop mechanism;

FIGURE 11 is a section view taken on line 11—11 of FIGURE 10 illustrating some of the carriage spacing line feed, carriage return and print hammer actuating linkage;

FIGURE 12 is a section view taken on line 12—12 of FIGURE 10 illustrating the solenoid controlled pawls for engagement with the typwheel shaft stop wheel and the pawl camming wheel;

FIGURE 13 is an exploded perspective of the typewheel shaft and the various elements disposed thereon;

FIGURE 14 is a view of the sliding contact side of a commutator plate;

FIGURE 15 is a view of the back side of a commutator plate showing segment connecting circuits;

FIGURE 16 is a perspective view from the rear lefthand side illustrating the compact arrangement of function operating linkage;

FIGURE 17 is an exploded perspective view of the function operating mechanism and power source as viewed from the rear of the printer;

FIGURE 18 is an enlarged section view taken on line 18—18 of FIGURE 9 illustrating the positive function clutch and control with the clutch in disengaged condition;

FIGURE 19 is a section view similar to FIGURE 18 illustrating the clutch elements immediately after the control armature is operated to permit clutch engagement;

FIGURE 20 illustrates the arrangement of pawl actuating holes in the clutch kickout plate;

FIGURE 21 is a section view taken on line 21—21 of FIGURE 18 illustrating the arrangement of the clutch pawl pivot pin and pawl camming pin relative to the driven plate and kickout plate;

FIGURE 22 is a perspective view illustrating the cooperation between the stop pawl and the stop wheel and camming wheel;

FIGURE 23 is an enlarged detail view illustrating the cooperative arrangement of the line feed mechanism between the function shaft and the typewheel shaft;

FIGURE 24 is an enlarged detail view illustrating the cooperative arrangement of the line return mechanism between the function shaft and the typewheel shaft;

FIGURE 25 is a top plan view showing details removed from the printer in FIGURE 9;

FIGURE 26 is a diagrammatic view illustrating the type-wheel character positions and the relative sensing cam positions; and FIGURE 27 is a timing chart illustrating the various printer functions between start and stop conditions.

*General*

Figure 1:
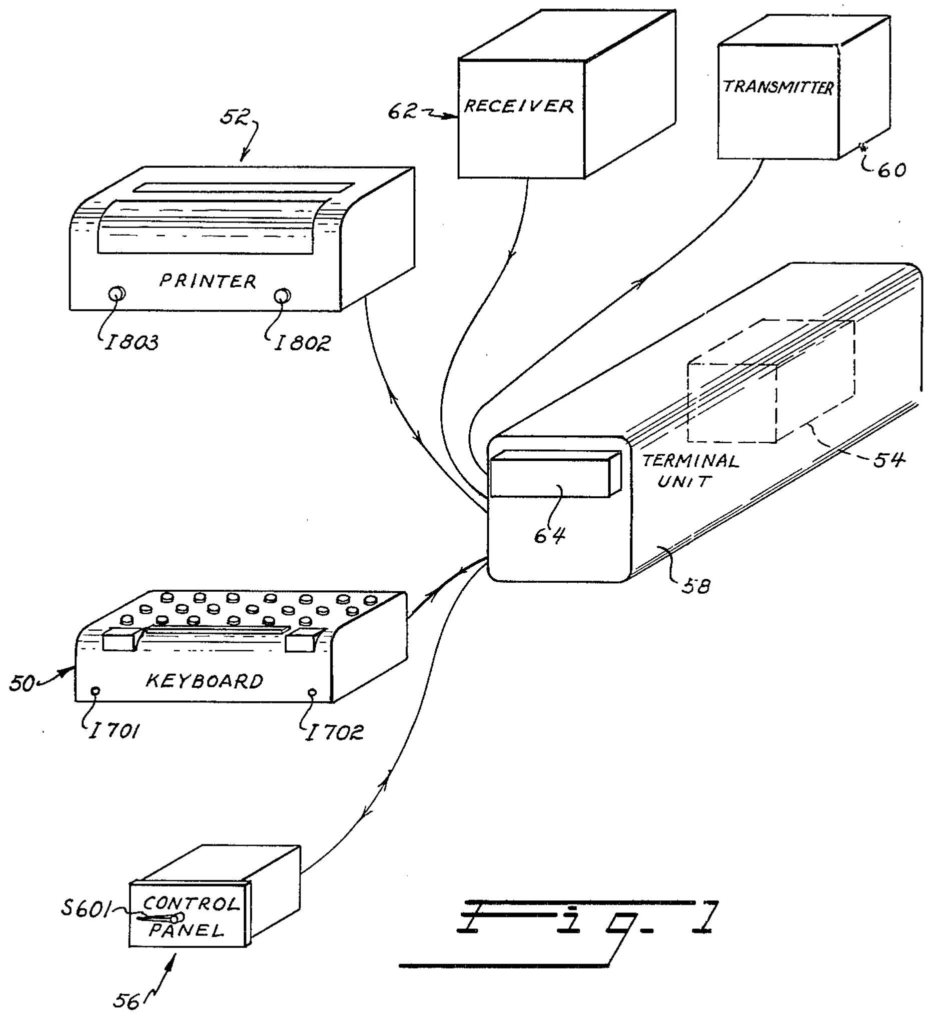
FIGURE 1 is a block diagram generally indicating the relationship of the several units which make up the communications equipment of the present invention.
Figure 2:
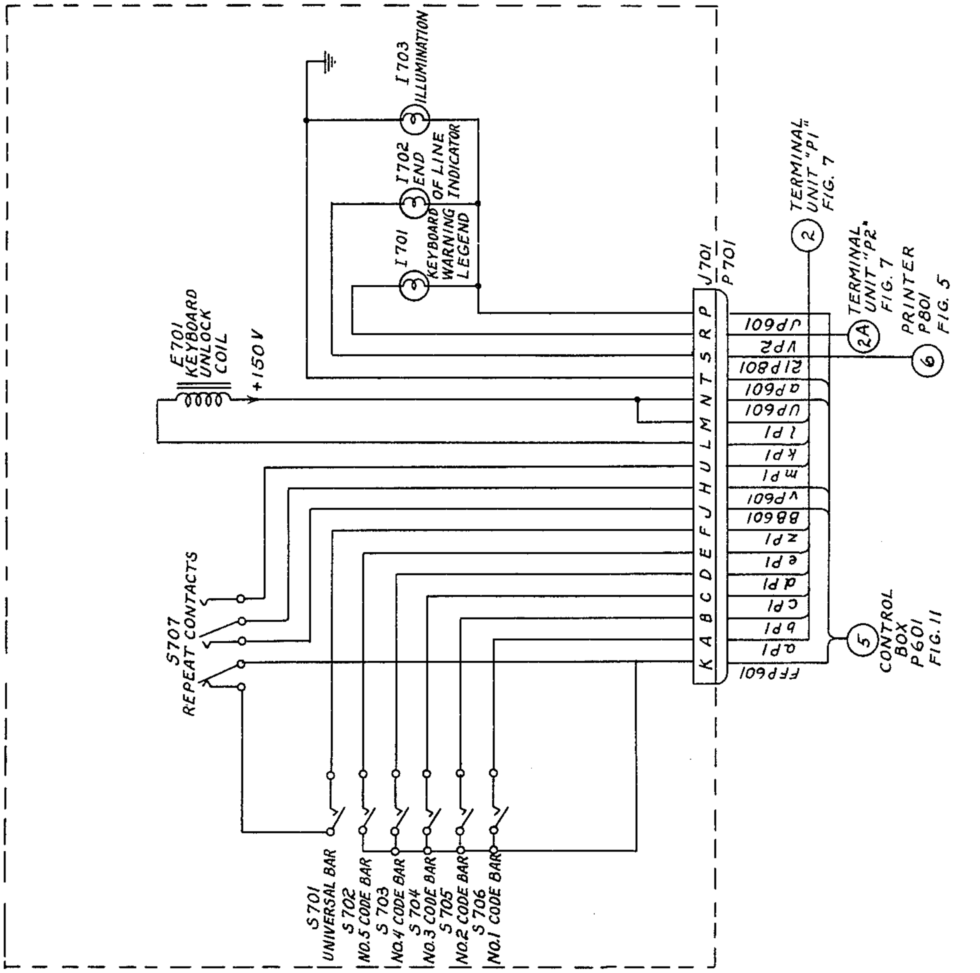
FIGURE 2 is a schematic wiring diagram of the keyboard unit.
Figure 3:
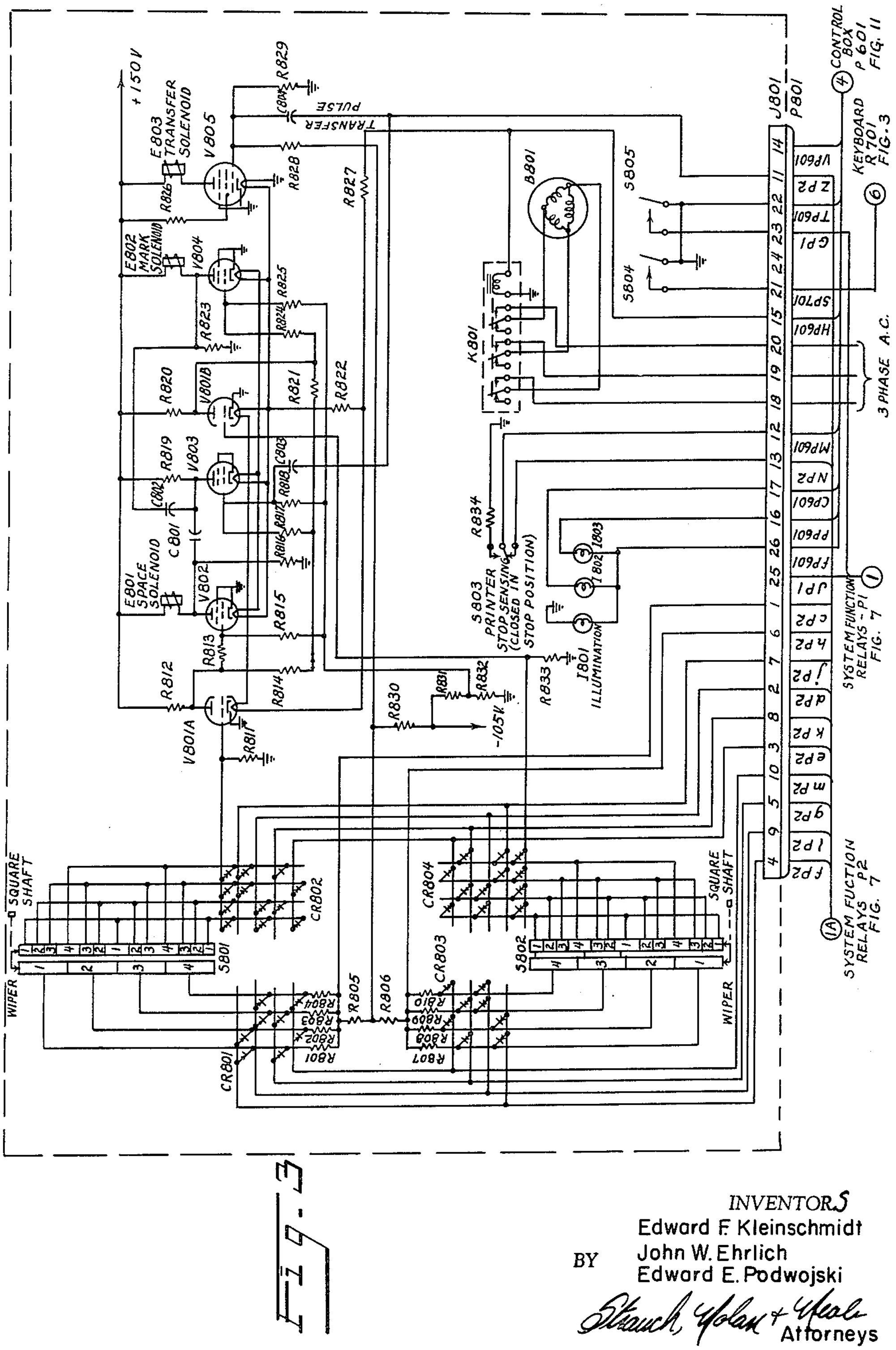
FIGURE 3 is a schematic diagram of the circuitry directly related to the printer unit.
Figure 4:
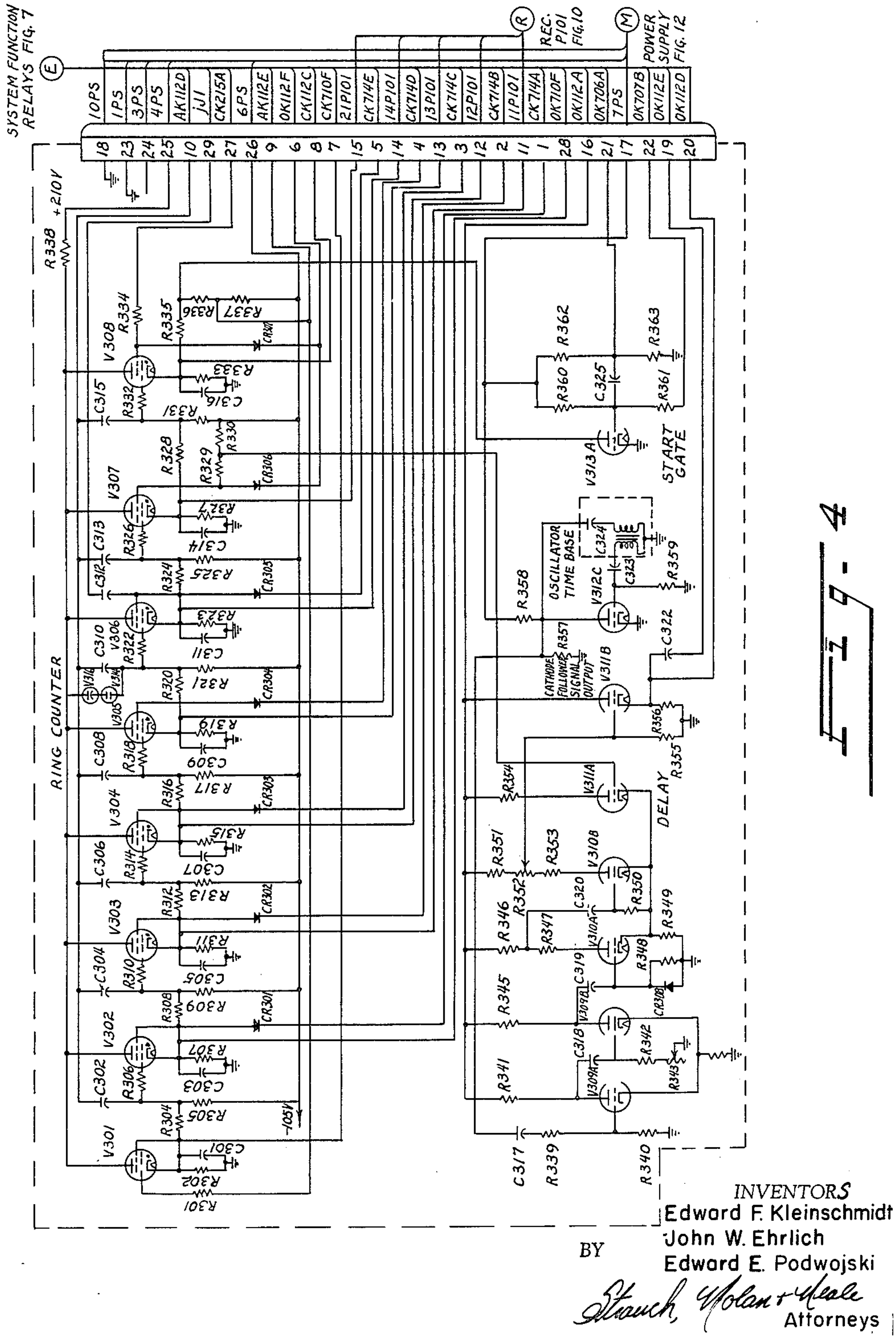
FIGURE 4 is a schematic wiring diagram of the transmitter and distributor circuit.

Referring to FIGURE 1, an exemplary combination of communication equipment with which the present invention can be utilized physically constitutes five basic units: a keyboard 50, the electrical circuitry of which is shown in FIGURE 2, a page printer unit 52, the mechanical details of which are shown in FIGURES 9–27 and the electrical circuitry directly related thereto being shown in FIGURE 3, a magnetic storage unit 54, a control box 56, the electrical circuitry of which is shown in FIGURE 7, and a terminal unit 58 housing the magnetic storage unit 54 and the circuitry shown in FIGURES 3–8.

In order that the relationship of the several components may be fully understood, this description will proceed with a brief general description of the functioning of the over-all system, a brief general description of the structure and operation of the several units, a detailed description of the circuitry and mode of operation of the printer and a detailed description of the mechanical structure of the printer.

The printing communication equipment of the present invention is designed primarily for use in an airborne installation in cooperation with a radio transmitter 60 and a radio receiver 62. The equipment may be operated to control the radio transmitter 60 to transmit a time sequential message signal coded in the well known Baudot code either directly under control of the keyboard 50 or under control of the magnetic storage unit 54, a copy of the transmitted message being recorded in either event by the printer unit 52. The equipment may be operated to store a message in the magnetic storage unit 54 under control of the keyboard for later transmission from the storage unit 54 through the radio transmitter 60, a printed copy of the message being made by the printer both during storage and transmission from storage. A message stored in the storage unit 54 may be transmitted repeatedly so long as the message has not been erased from the storage unit. The equipment is further operable to receive messages identified by a unit call designation of the particular unit (that is, the particular aircraft in which the equipment is installed), and to receive messages identified by the group designation of the group of which the unit is a part (that is, the group of aircraft of which the aircraft in which the equipment is installed is operatively associated) or may be operated to print all messages transmitted on the frequency to which the receiver is tuned.

The printer unit 52 receives messages and records them on sprocket fed paper. It is associated with the signal circuits through the terminal unit 58. Incoming messages through receiver 62 are recorded by the printer 52 as page copy and all messages transmitted from the keyboard 50 or magnetic recorder 54 are monitored by the printer unit 52.

Two lamps I–802 and I–803 on the cover of the printer unit 52 indicate the source of the message being printed.

The right-hand lamp I–802 glows when messages are coming from the radio receiver and the left-hand lamp I–803 glows when the printer is operating under all other conditions.

The keyboard unit 50 is provided with a standard arrangement of keys manually operable to cause the transmission by transmitter 60 of signals indicative of the 26 characters of the alphabet, plus signals indicative of line return, line feed, letters and space functions or to store such signals in the magnetic recorder 54 for future transmission. All messages originating at the keyboard 50 are monitored by the printer 52. A red lamp I–702 on the right end of the keyboard 50 glows to indicate the 66th character position of the printer 52, and a red lamp I–703 at the left end of the keyboard 50 glows to indicate, in the illustrated embodiment, that five lines of recording medium are available at the storage unit 54.

So long as the space bar of the keyboard 50 is depressed, closing contacts S–707 (FIGURE 2), the space designation of the code will be repeated.

The terminal unit 58 is an enclosure containing: the magnetic recorder 54, a telegraph transmitter circuit (FIGURE 3), a telegraph receiver circuit, a call system circuit (FIGURE 6), an amplifier circuit, switching relay circuits (FIGURE 5) and a power supply circuit (FIGURE 8). The magnetic recorder provides a means by which a message, or messages, originating from the keyboard unit 50 may be recorded and stored for future automatic transmission by the radio transmitter 60. The recorded message can be transmitted as many times as is necessary so long as it has not been erased.

The telegraph transmitter (FIGURE 4) is made up of electronic equipment and circuits for generating coded sequential signals which are initiated by depressing a key on keyboard 50 or by operation of the magnetic recorder 54. The telegraph receiver is made up of electronic equipment and circuits to convert coded sequential signals from the radio receiver 62 into simultaneous signals to be delivered to the printer 52 for its operation. The call system (FIGURE 6) is an arrangement of electronic equipment and circuits for turning the printer 52 on or off as indicated by a coded signal from the radio receiver 62. It also turns the recorder 54 off at the end of transmission. The recorder amplifier strengthens the signals received from the magnetized tape of the recorder 54 which are subsequently sent on a simultaneous basis to the printer 52 and on a sequential basis to the radio transmitter 60. Power supply (FIGURE 8) contains electronic equipment to convert the available power source of 115 v., 400 cycle alternating current to the various A.C. and D.C. levels necessary for the operation of all the other equipment. A connection to a 26.5 v. battery current is also a part of this sub-unit.

A call patch box 64 is attached to the front of the terminal unit 58. It is an arrangement of diode matrix pots and circuits which define the unit call and broadcast call signals for the printer 52. The diode matrix pots have plug-in connectors to facilitate call system designation changes.

The control panel 56 (FIGURE 7) is manually operated to control the various functions of the equipment. A rotary selector switch S–601 determines the type of operation. This switch S–601 has five positions: TRANS KBD (radio transmission under keyboard control), TRANS STORE (radio transmission under control of the storage unit), RCVE (printing a received radio message), REWIND (rewind of the tape of the storage unit to its start position), and STORE (storage of a message under keyboard control). A CALL toggle switch has two positions: IN (in which only messages having proper call designations are monitored) and OUT (in which all messages are monitored). A POWER switch controls the electric current for the whole set. A lamp I–601 glows while power is on and another lamp I–602 glows after the rewind of the magnetic tape.

The terminal unit 58 of this equipment supplies to the transmitter 60 and receives from the receiver 62, electrical signals in a code form commonly known as "Baudot."

The signals used to designate the code for a character or function are of two types: "spacing" and "marking." Spacing signals are timed interruptions of a line current and marking signals are timed pulses of the current. By combining these two electrical conditions in groups of five in all possible ways, 32 different arrangements are possible, 26 of these permutated groups are used as code designations for the alphabet and the remaining 6 are used as code designations for printer functions.

With each one of the groups of five signals is included a "spacing" signal at the start and a "marking" signal at the finish. The addition of these two signals makes it possible to control the starting and stopping of the receiving equipment. The starting signal and the five intelligence signals are of equal length while the stop signal is 1.5 times as long. This longer stop pulse aids in synchronization of the transmitting and recieving equipment.

The basic principle of the operation of this teletypewriter equipmesnt is one of converting the coded positions of 5 mechanical elements into simultaneous current or no current conditions on 5 wire lines. These conditions in turn are distributed on a timed sequential basis for transmission over a single line. At the receiving end the reverse of this takes place and the single wire sequential group is converted to a five wire simultaneous group. In this case the coded electrical conditions of the five wires act to set a mechanical element in one of 32 positions which is indicated by that code group.

*General operating procedure*

To transmit from the keyboard to the radio terminal (messages originating at the keyboard are supplied to the radio transmitter in the form of sequential signals and at the same time are monitored by the printer unit), three steps are taken in addition to turning on the transmitter: (1) Shift POWER toggle S–603 (FIGURE 7) to ON, (2) turn selector switch S–601 (FIGURE 7) to TRANS KBD, and (3) manipulate keyboard 50 (FIGURE 2).

To store a message for future transmission (messages originating from the keyboard are printed and also stored in the magnetic tape recorder for transmission at a later time), four steps are taken: (1) Shift POWER toggle S–603 (FIGURE 7) to ON, (2) turn selector switch S–601 to REWIND until lamp I–602 glows (the tape recorder is caused to rewind all of the tape on the take-up spool, thus bringing the beginning of the tape to the recording head. The glowing of lamp I–602 indicates that this has been completed), (3) turn selector switch S–601 to STORE, and (4) manipulate keyboard 50 (FIGURE 2).

To transmit a stored message to the radio terminal (messages previously stored in the magnetic recorder are supplied to the radio transmitter and monitored by the printer. At the end of these messages the equipment is automatically transferred from the TRANS STORE to RCVE condition), three steps are taken in addition to turning on the transmitter: (1) Shift POWER toggle S–603 to ON, (2) turn selector switch S–601 to REWIND and wait for lamp I–602 to glow, (3) turn selector switch S–601 to TRANS STORE.

To print only incoming messages preceded by the designated unit or group call signals (this is the normal stand-by condition in which sequential signals from the radio receiver cause the printer to type a page copy of only those messages which are preceded by correct unit or group call signals), three steps are taken: (1) Switch POWER toggle S–603 to ON, (2) turn selector switch S–601 to RCVE, (3) switch CALL toggle S–602 to IN.

To monitor home copy or to print incoming messages preceded by correct call signals (this is the condition where messages sent to the magnetic recorder for storage and monitored by the printer may be interrupted by incoming messages preceded by correct call signals. The keyboard will be locked until an End-of-Message signal is received, at which time the keyboard will be unlocked and local monitoring resumed), three steps are taken: (1) Switch POWER toggle S–603 to ON, (2) turn selector switch S–601 to STORE, (3) switch CALL toggle S–602 to IN. If the incoming message fails to supply an End-of-Message signal the keyboard will remain locked and the set will continue to be in RECEIVE condition. To break the call system the operator must: (1) Turn the selector switch S–601 to RCVE, (2) switch the CALL toggle S-602 to OUT. The selector switch S–601 may then be turned back to STORE and the CALL toggle S–602 switched to IN.

To receive all messages (this is the condition in which the printer 52 types all messages which are picked up by the radio receiver), the operator must: (1) Shift POWER toggle S–603 to ON, (2) turn selector switch S–601 to RCVE, (3) shift CALL S–602 toggle to OUT. This condition may also be operated in STORE or while monitoring line copy as in the preceding paragraph.

Before proceeding with the detail explanation of the circuitry, a brief explanation of the symbolism used in the circuit drawings is in order. In reference to relays, all relays are designated with the letter K followed by an identification numeral. Thus K100 indicates relay 100 or a connection to the coil of relay 100. A letter suffix to a relay designation, such as K100A, indicates a connection to the "A" groups of contacts of relay 100. The letter prefixes C, O, A, such as CK100A, OK100A, designate respectively the normally closed, the normally open and the armature contacts of the A group of contacts of relay 100 or connections to those contacts. The letters R, C, E, V, CR, T, B, S, L and PS followed by numerals represent conventionally resistors, capacitors solenoids electron valves-vacuum and thyratrons, crystal rectifiers or diodes, transformers and magnetic core storage units, motors, switches, inductances and power supply terminals respectively or connections to such elements. The letters J and P followed by numerals designate sockets and plug connectors and letter or numeral prefixes for such designations indicate the pin connections of such sockets and plugs or connections thereto.

*Printer unit circuitry*

The printer unit is used to produce a printed record during the "transmit keyboard," "store," "transmit store," and "receive" operations of all transmitted, received and stored messages. Basically, the printer unit, a typewheel page printing receiver which records upon a continuously fed roll of paper, comprises a function shaft and a typewheel carrying square shaft mounted for rotation about spaced parallel axes and drive coupled through a friction clutch. Drive torque is applied to the function shaft through a one revolution positive drive clutch from a motor B–801 (FIGURE 3) but the positive clutch is normally held disengaged by the armature of solenoid E–803. Upon each energization of solenoid E–803 the positive clutch is engaged and rotates the function shaft through a single revolution.

The periphery of the typewheel is divided into thirty-two equal spaces, twenty-six of which contain alphabetical type faces. This wheel is mounted upon the square shaft for rotation therewith, whereby character selection is preformed, and for movement axially of the square shaft, whereby line space and line return movements are effected. Rotative positioning of the square shaft is utilized in conjunction with cams in the function shaft to effect printing, line feed, line return and automatic line return and feed. Fixed for rotation with the square shaft adjacent one end thereof is a sixteen toothed stop wheel. During a cycle of operation of the printer, the square shaft is released for rotation simultaneously with the release of the function shaft but its movement may be arrested at any one of the thirty-two possible positions of the print wheel. Movement of the square shaft is arrested by the energization of either solenoid E–801 or E–802 to engage the armature of the energized solenoid with an aligned tooth of the sixteen tooth stop wheel. The armatures of solenoids E–801 and E–802 are so spaced about the periphery of the sixteen toothed stop wheel that one is operative to stop the square shaft at sixteen equally spaced positions and the other operative to stop the square shaft at a position intermediate each of those sixteen positions to provide a total of thirty-two positions.

The energization of each of the solenoids E–801 and E–802 is synchronized during rotation of the square shaft with the sixteen possible positions at which it may be operated by one of two commutators S–801 and S–802, each having sixteen output segments coupled respectively to the input circuits at solenoids E–801 and E–802 and a wiper fixed for rotation with the square typewheel shaft. During each printer cycle, a single commutator segment of the total of thirty-two is rendered operative to transmit a signal to energize the associated one of solenoids E–801 or E–802 and arrest movement of the typewheel shaft and print wheel at the desired position.

After the typewheel has been positioned in this manner, a print hammer strikes the paper against the selected type face to cause the light surface of the paper to be broken to reveal a dark paper base in the form of the selected character. If the positioning of the typewheel corresponds to a function signal rather than a character signal, the print hammer is blocked by a cam on the typewheel shaft during operation of the printer in accordance with the selected functions of space, line feed, and line return.

Referring now to the circuitry in detail, the drive motor B–801 (FIGURE 3) is connected through the normally open contacts of relay K–801 to an external source of three phase 400 cycle 115 volt current. Relay K–801 is energized as soon as the power switch S–603 is turned on by applying 26.5 volts through pin 15 of J–801 and P–801 (FIGURE 3), through pin H of P–601 and J–601 (FIGURE 7) and through the left-hand contact of the double pole switch S–603 to an external battery source of 26.5 volts D.C. The motor B–801 (FIGURE 3) is, therefore, running so long as the power switch S–603 (FIGURE 7) is on.

Figure 5B:
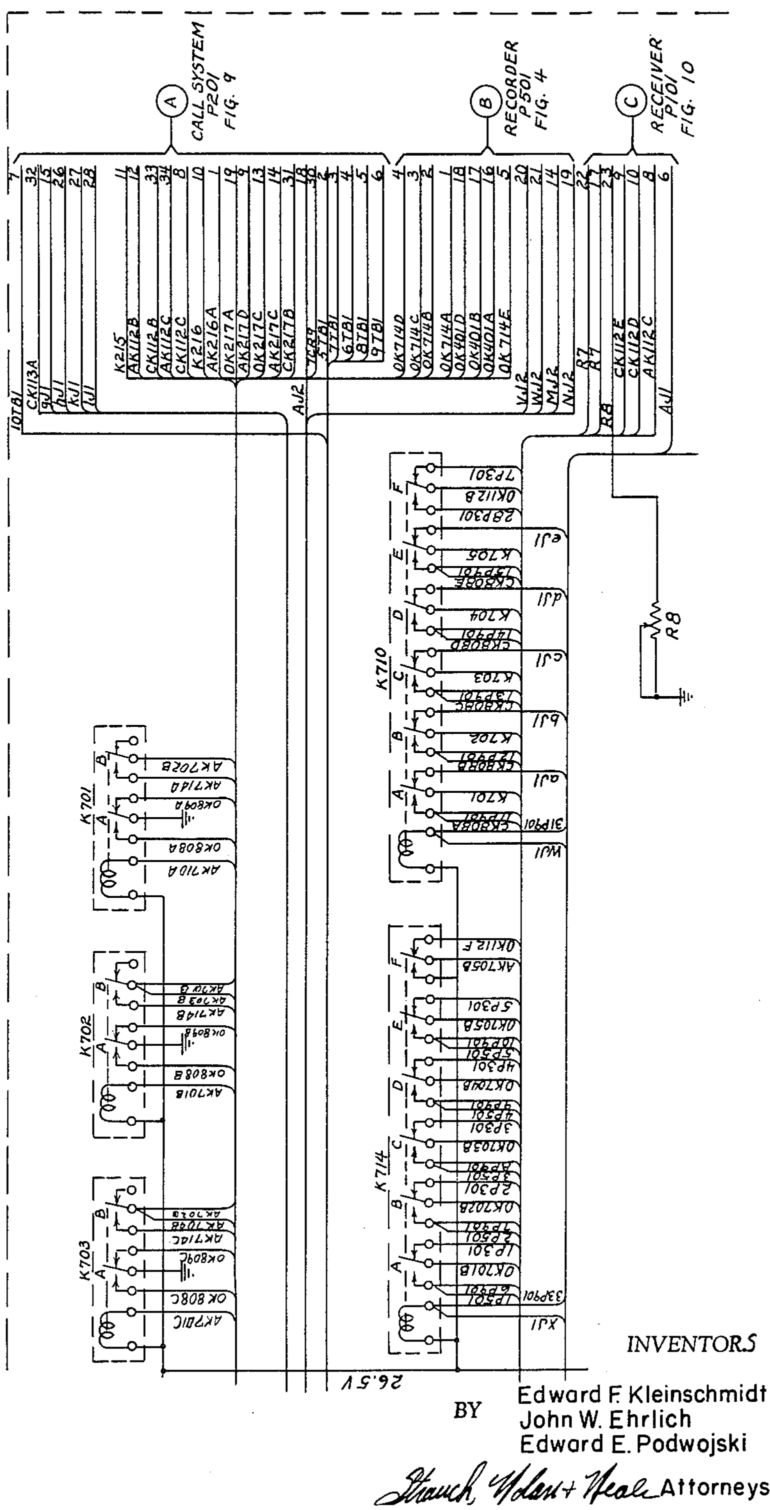
Figure 5C:
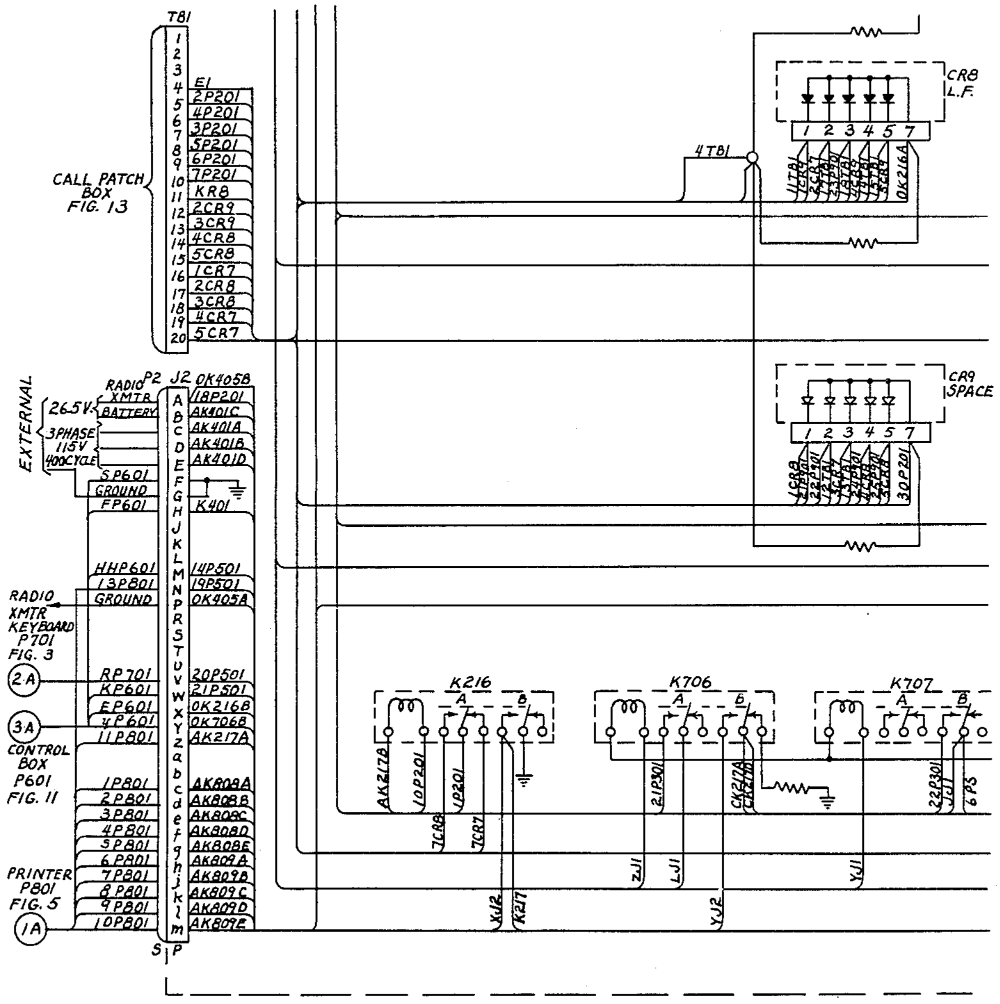

The selection of the one of commutators S–801 and S–802 which is operative for any given code group of five unit signals of the Baudot code is effected under control of the first unit signal of the code group. Considering first the printer actuation under keyboard control, in connection with the description of the keyboard circuitry shown in FIGURE 2, the closing of the number 1 code bar contact S–706 is effective to energize relay K–701 shown in FIGURE 5B. So long as K–701 remains de-energized, ground is applied through the normally closed contacts of K–701A through the normally open contacts K–809A (K–809 and K–808 being energized, as will be explained hereinafter, so long as the selector switch S–601 (FIGURE 7) is set to its "store," or "transmit store" and no incoming signal is received, or its "transmit keyboard" positions), through pin H of J–2 and P–2 (FIGURE 5C), through pin 6 of P–801 and J–801 (FIGURE 3) to apply ground to the junction of resistor R–806 with the resistors R–807 to R–810. As will become apparent presently, the grounding of this junction point renders commutator S–802 inoperative. Since S–706, number 1 code bar contact, in its open position corresponds to a space in the first unit of the five unit code and results in K–701A (FIGURE 5B) remaining open and the application of ground through pin 6 of J–801 to render commutator S–802 inoperative, commutator S–802 is operative when a mark signal appears in the first unit of the five unit code and is inoperative when a space signal appears in the first unit of the five unit code. Thus, if a mark signal appears in the first unit of the code, S-706 (FIGURE 2) is closed to energize relay K-701 (FIGURE 5B) to apply ground through the normally open contacts of K-701A through the normally open contacts K-803A (which are closed during "store," "transmit store" and "transmit keyboard" operation) through pin C of J-2 (FIGURE 5C), through pin 1 of P-801 and J-801 in the input resistor network to commutator S-801, commutator S-801 is rendered inoperative and S-802 is operative. It will be noted that the transfer of the armature contact K-701A removes the ground from the resistor network to commutator S-802 through pin 6 of J-801 so that S-802 is operative for a mark signal in the first unit of the five unit code.

The relays K-702, K-703, K-704, and K-705 (FIGURES 5A and B), through the position, transferred or normal, of their A armature contacts, are effective to control the individual position at which the square shaft is stopped. The normally closed A contacts of relays K-702, K-703, K-704 and K-705 are effective so long as these relays remain de-energized to apply ground through the normally opened contacts K-809B, K-809C, K-809D and K-809E through pins J, K, L and M of J-2 and P-2 (FIGURE 5C) to pins 7, 8, 9 and 10 of P-801 and J-801 (FIGURE 3). The normally opened contacts K-702A, K-703A, K-704A and K-705A are effective, upon energization of any of these relays K-702, K-703, K-704 and K-705, to apply ground through the associated normally opened contacts K-808B, K-808C, K-808D and K-808E through pins D, E, F and G of J-2 and P-2 to pins 2, 3, 4 and 5 of P-801 and J-801 (FIGURE 3).

Therefore K-702 in its de-energized position applies ground to pin 2 or 7 of J-801 alternatively, if K-702 remains de-energized, corresponding to a space in the second unit of the five unit code, ground is applied to pin 7, if K-702 is energized corresponding to a mark in the second unit of the five unit code ground is applied to pin 2 of J-801. Similarly K-703 controls the alternative application of ground to pins 8 and 3 of J-801, pin 8 being grounded so long as K-703 remains de-energized and pin 3 being grounded upon energization of K-703. Relay K-704 controls the alternative application of ground to pin 9 or 4 of J-801, pin 9 being grounded so long as K-704 remains de-energized and pin 4 being grounded upon energization of K-704. K-705 controls the alternative application of ground to pin 10 or pin 5 of J-801, pin 10 being grounded so long as relay K-705 remains de-energized and pin 5 being grounded upon energization of relay K-705.

As is apparent from reference to FIGURE 3, the selective grounding of pins 4, 9, 5 and 10 of J-801 through the actions of the diode networks CR-801 and CR-803 is effective to ground all but one of the four left-hand segments, 1, 2, 3 and 4 of the commutators S-801 and S-802. Further the selective application of ground to the pins 3, 8, 2 and 7 of J-801 is effective through the diode networks CR-802 and CR-804 to ground all but one of the four commutator segments 1, 2, 3 and 4 in any group of four commutator segments of the right-hand half of the commutators S-801 and S-802 corresponding to any single commutator segment on the left-hand half of commutators S-801 and S-802. Thus, for any given setting of relays K-701 to K-705, a selection is made between commutators S-801 and S-802 by relay K-701, a selection of an individual one of the four segments of the left-hand half of the commutators S-801 and S-802 will be made by the coaction of relays K-704 and K-705 with the diode networks CR-801 and CR-803, and a selection of a single one of the four commutator segments on the right-hand half of the commutators S-801 and S-802 corresponding to the selected one of the commutator segments on the left-hand half of those commutators will be made by the coaction of the diode network CR-802 and CR-804 with relays K-702 and K-703.

A negative 105 volts D.C. is applied to the junction between resistors R-830 and R-831 (FIGURE 3) through pin 25 of J-801 and P-801, through pin J of P-1 and J-1 (FIGURE 5A) and through the terminal of the movable contact of K-707B (FIGURE 5C) from terminal 6 of the power supply (FIGURE 8). This negative voltage is applied through a voltage divider network to the junction between R-805 and R-806 (FIGURE 3).

As to the one of the commutators S-801 or S-802 which is rendered inoperative by grounding of the pin 1 or 6 of J-801, the voltage appearing at the junction between R-805 and R-806 is dropped completely across R-805 or R-806, so that the associated one of the diode networks CR-801 or CR-803 is grounded. As to the one of the diode networks CR-801 or CR-803 which is not grounded by pin 1 or 6 of J-801, which for example we will assume to be CR-803, the negative voltage appearing at the junction of R-805 and R-806 is dropped through R-806 and through the three resistors of the group R-807, R-808 and R-809 and R-810 which are grounded through the diodes of the diode network CR-803 by the pins 4, 9, 5 and 10 of J-801. As to the one of the four lines leading to the four left-hand commutator segments designated 1, 2, 3 and 4 of S-802 which is not grounded by the diode network CR-803, which in the present example we will assume to be segment number 4, corresponding to the ungrounded condition of pins 9 and 10 of J-901, the negative voltage will appear on the segment numbered 4 of the left-hand half of the commutator S-802. Assuming that pins 3 and 2 of J-801 are ungrounded and pins 8 and 7 are grounded, as the wiper of the commutator S-802 advances along the commutator segments, the three commutator segments of the left-hand side of the commutator S-802 designated 1, 2 and 3 are grounded so that no signal will be transmitted through the commutator wiper. As the commutator wiper advances along the length of the number 4 segment of the left-hand half of the commutator S-802 through the four steps designated 4, 3, 2 and 1, segments 4, 3 and 2 have been grounded through the diode network CR-804 by the ground appearing on pins 8 and 7 of J-801. When the wiper advances to the number 1 commutator segment associated on the right-hand side of the commutator S-802 associated with the number 4 segment on the left-hand side of that commutator, the negative voltage applied at the junction of R-805 with R-806 will produce current flow through R-833, the one of the lower row of diodes of the diode matrix CR-804 associated with the lead to the number 1 commutator segments of the right-hand half of the commutator S-802, through the wiper and the number 4 commutator segment of the left-hand half of the commutator S-802 through R-810 and R-806. The negative voltage appearing at the ungrounded end of R-833 is applied to the grid of an amplifier tube V-810B, the anode of which is coupled through resistance R-824 to the grid of a thyratron tube V-804 in the anode circuit of which the Mark solenoid E-802 is connected. Therefore when this circuit is completed, a negative pulse will be applied to V-810B producing a positive pulse to V-806 to turn on that thyratron tube and energize the solenoid E-802 to cause its armature to engage the sixteen tooth ratchet affixed to the square shaft of the printer and terminate rotation of the square shaft.

If the first unit of the five unit code has been a space signal rather than a Mark signal so that pin 6 of J-801 was grounded and pin 1 remained ungrounded, the circuit made through the diode network CR-801 and CR-802 and the commutator S-801 would have applied a negative voltage to the grid of amplifier tube V-801A across through resistor R-811 producing a positive signal through R-813 to the grid of thyratron tube V-802 to energize the space solenoid E-801 and engage its armature with the sixteen tooth ratchet to arrest movement of the square shaft at a position offset by one thirty-secondth of a revolution from the position at which it would be stopped under control of the Mark solenoid E–802.

By this circuitry therefore any permutative setting of the code bar operated switches S–702, S–703, S–704, S–705 and S–706 is effective to arrest movement of the print wheel carrying square shaft of the printer at the one of the thirty-two possible positions corresponding to that permutation of the code bars.

The line feed of the paper and line return of the print hammer and typewheel are: automatic, key controlled or manually operable. The automatic line feed and line return functions operate mechanically when the typewheel and print hammer reach the extreme right-hand side of the page as will be explained later. This feature prevents the loss of copy when the line return signal is not received after the seventy-second character. The key control line feed and line return functions are operated from the separate keyboard unit 50 or other remote transmitting equipment. The Baudot code signal for line return causes both line feed and line return mechanisms to operate through positioning of the square shaft. The printer is also automatically line returned and line fed when a button on the upper right-hand side of the printer unit is manually depressed. The operation of the printer on line feed and line return under signal control is effected mechanically after the square shaft of the printer has been positioned to the position corresponding to those signals.

The typewheel and print hammer are attached to drum wound cables and a pawl and detent engaging ratchet of the drums spaces them across the page. A spring is wound up as the spacing takes place and release of the space pawl and detent will allow the hammer and typewheel to return to the start of the line. The print hammer is blocked from striking the paper when a function designation is received. The mechanism is driven through gears and clutches from the three phase induction motor B–801.

As previously noted, the lamp I–802 (FIGURE 3), when glowing, indicates that the message being recorded by the printer is coming from the radio receiver 62 and another lamp I–803, when glowing, indicates that the printer is monitoring a message to the radio transmitter 60 either from the keyboard 50 or from the storage unit 55. Lamps I–802 and I–803 have a common connection from one terminal thereof through pin 26 of J–801 and P–801, through pin F of P–601 (FIGURE 7) and through pin M of J–601 and P–601 to an external source of 26.5 volts D.C.

Figure 5D:
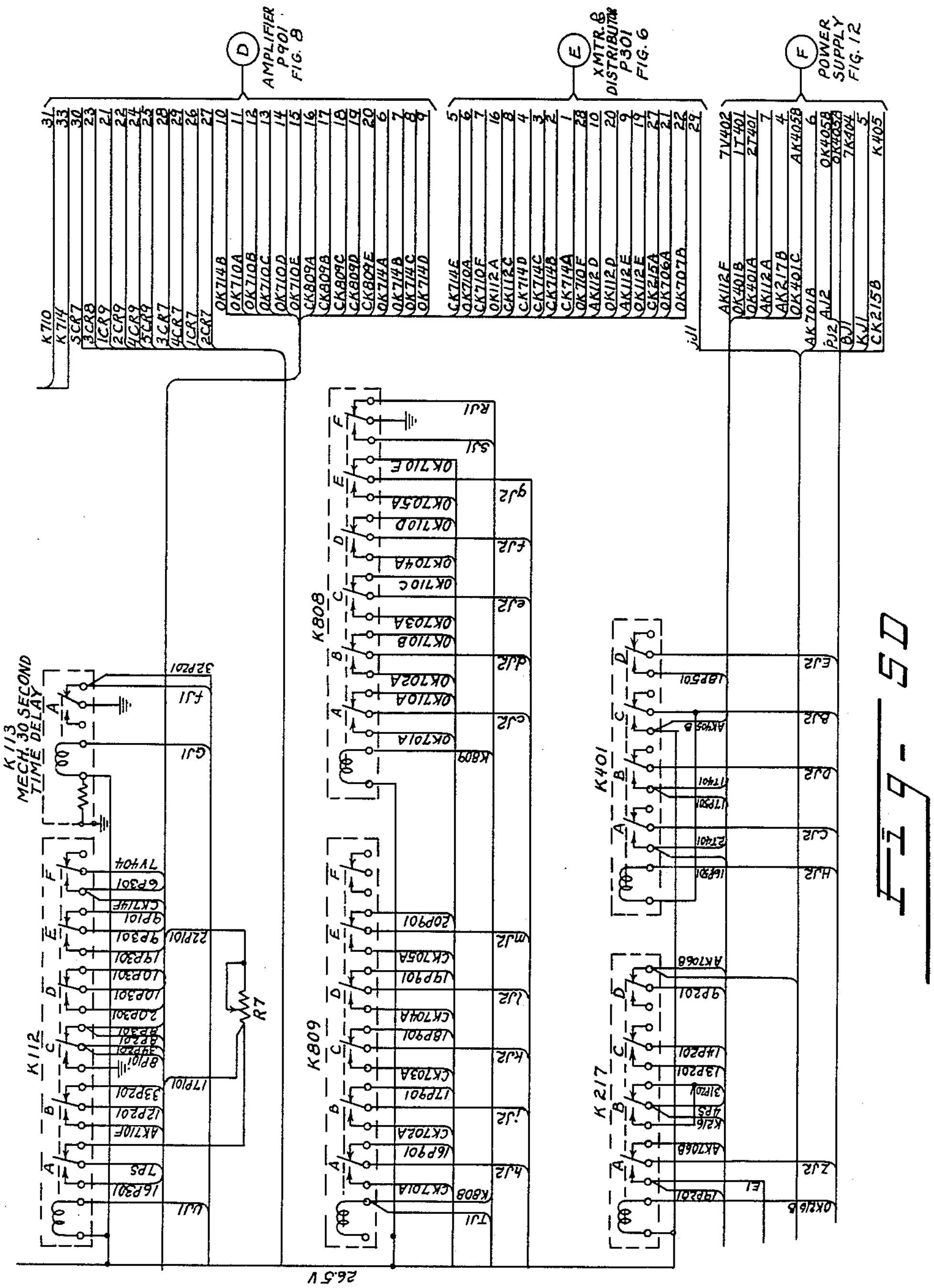

The opposite side of lamp I–802 is connected through pin 17 of J–801 and P–801, through pin C of P–601 and J–601 (FIGURE 7), through the normally open contacts K–601C of relay K–601 which is energized during "transmit keyboard," "transmit store" operations and during "receive" operation whenever a message signal is being received by the unit from an external source through pin R of J–601 and P–601, through pin R of P–1 and J–1 (FIGURE 5A), and through the normally closed contacts K–808F of relay K–808 (which is energized during "transmit keyboard," and "transmit store" and "store" operations only during actual transmission and storing) to ground (FIGURE 5D), so that I–802 (FIGURE 3) is illuminated upon the energization of relay K–601 (FIGURE 7) in response to the receipt of an incoming signal, and so long as K–808 remains de-energized as it does when selector switch S–601 either is in its "Receive" position or during receipt of a message when S–601 is in its "store" or "transmit store" positions.

The opposite side of lamp I–803 (FIGURE 3) is connected through pin 16 of J–801 and P–801 through pin P of P–601 and J–601 (FIGURE 7), through the normally open contacts K–601D of relay K–601, through pin N of J–601 and P–601, through pin S of P–1 and J–1 (FIGURE 5A) and through the normally open contacts K–808F of relay K–808 (FIGURE 5D) to ground. The simultaneous energization of K–601 and K–808 is indicative of the fact a message is being transmitted. Thus when selector switch S–601 is set to "transmit keyboard" or when S–601 is set to "transmit store" and relay K–808 is energized, lamp I–803 is illuminated. With S–601 set to "transmit store" or "store" and, relay K–808 de-energized by the receipt of an incoming message, or with S–601 in its "receive" position and a signal being received, lamp I–802 (FIGURE 3) is illuminated (FIGURE 7).

A further lamp I–801 is connected between ground and the common connection for lamps I–802 and I–803 to pin 26 of J–801 (FIGURE 3) to provide illumination for the page copy of the printer unit.

A cam on the spacing drum actuates a switch S–804 at the sixty-sixth character position to cause illumination of the end of line margin lamp I–701 (FIGURE 2) of the keyboard to glow as has been previously explained in reference to the keyboard unit.

A further switch S–803, a single pole double throw switch is in its closed position as shown in FIGURE 3 so long as the frictionally driven main shaft of the printer unit is in its stop position and is effective to connect terminals 12 and 13 of J–801 and P–801. At all other times the contact is transferred to ground pin 12 of J–801 and P–801 through resistor R–834. This switch is part of the interlock circuit for the keyboard unlock coil E–701 as has been explained above.

In describing the operation of the stopping of the square shaft of the printer, it has been assumed thus far that the square shaft was rotating. Before the square shaft can be rotated, it is necessary to disengage the armature of the last energized one of the solenoids E–801 and E–802 from the sixteen tooth ratchet and permit drive connection of the main power shaft to the drive motor B–801. This main power shaft is coupled to the drive motor B–801 through a one revolution clutch mechanism controlled by actuation of the transfer solenoid E–803. In order to initiate a cycle of operation of the printer, a positive pulse is applied through pin 11 of J–801 and through capacitor C–804 to the grid of the tube V–805 to render that tube conductive to energize the transfer solenoid E–803 to permit drive connection between the main power shaft of the printer and drive motor B–801. This same pulse is applied through capacitor C–803 to the grid of tube V–803 which in turn applies a negative pulse through capacitors C–801 and C–802 to the anode circuits of thyratrons V–802 and V–804 to cut off the conducting one of those two tubes and de-energize the one of the solenoids E–801 or E–802 which are previously energized, to thereby release the sixteen toothed ratchet and the square shaft of the printer to permit rotation of that shaft from the function or main drive shaft through the frictional connection therebetween.

This positive pulse applied through pin 11 of J–801 and P–801 originates in three different ways: (1) from the operation of the universal bar of the keyboard, (2) from the operation of the magnetic recorder reproducer during transmission, and (3) operation of the telegraph receiver.

Pin 11 of J–801 and P–801 is connected through pin Z of P–2 and J–2 to the armature contact of K–217A of relay K–217. Relay K–217 is energized upon the grounding of the normlaly opened contact K–216B upon energization of relay 216 which occurs when the transmitter is turned on to apply 26.5 volts to AJ2, through 18P201 (FIGURE 6), R–262, R–239, 10J–201 and P–201, K–216 (FIGURE 5C), AK217B as a terminal, to 4PS, a 210 v. terminal (FIGURE 8), for "transmit keyboard" and "transmit store" operations and when the proper designation of a unit call or a broadcast call is received by the equipment through the receiver 62 when set to "transmit store," "store" or "receive," and when the equipment is set to "receive" and the call switch S–602 is in its "out" position. With K–217 de-energized during actual storage operation the normally closed contact of K–217A is connected to the armature contact of K–706B which latter contact is also connected to the normally closed contact of K–217D. When the selector switch S–601 is set to store (FIGURE 7), and K–706 is energized upon actuation of the universal bar contact S–701 (FIGURE 2) pin 11 of J–801 (FIGURE 2) is connected through the normally closed contacts K–217A, through the normally open contacts K–706B, through pin Y of J–2 and P–2 (FIGURE 5C), through pin Y of P–601 and J–601 (FIGURE 7) to the junction between R–602 and R–603 forming a voltage divider network for the 150 voltage applied through pin Z of J–601, as has been described hereinbefore, and through the movable arm of the stage 4A of selector switch S–601 when in its store position. This positive signal applied through pin 11 of J–801 during store operation initiates operation of the main power shaft and square shaft of the printer, as has been described hereinbefore.

During any receiving operation and when the transmitter is on during "transmit keyboard' and "transmit store" operations, K–217 is energized so that the armature contact of K–217A connects pin 11 of P–801 (FIGURE 3) to pin 19 of P–201 (FIGURE 6) which is connected to the cathode of cathode follower tube V–210A. During receiving operations, the grid of cathode follower tube V–210A receives its input from the delayed multivibrator V–209A and V–209B through pin 33 of J–201, P–201, the normally closed contact K–112B which is deenergized during "receive," "rewind" and "store" operations and energized during "transmit keyboard" and during "transmit store" operations while K–215 remains deenergized. The delayed multi-vibrator formed by tubes V–209A and V–209B receives a pulse through capacitor C–212, through pin 34 of J–201, P–201, through the normally closed contacts K–112C and through pin 8 of J–301, P–301 (FIGURE 4) from the cathode of the number 8 ring counter distributor tube V–308. When the eighth distributor tube V–308 (FIGURE 3) is turned on at the end of each cycle of the ring counter, a positive pulse will be transmitted to the delayed multi-vibrator formed by tubes V–209A and V–209B (FIGURE 6) which will cause the cathode follower V–210A to conduct thus supplying a positive pulse to the pin 11 of J–801 (FIGURE 3).

During "transmit keyboard" and "transmit store" operations, the transfer pulse to the printer through pin 11 of J–801 (FIGURE 3) is also derived from the cathode of cathode follower tube V–201A via pin 19 of J–201, OK–217A and ZJ2 but, in "transmit keyboard," the grid of cathode follower tube V–201A is controlled by a signal derived from the cathode of the first distributor tube V–301 (FIGURE 4), via 7P–201, CK–210F (FIGURE 5), AK–710F, OK–112B, A–K–112B and 12P–201 (FIGURE 6) and, in "transmit store," the grid of cathode follower tube V–201A is controlled by a signal derived from the cathode of the second distributor tube V–302 (FIGURE 4) via 28P–301, OK–710F (FIGURE 5), AK–710F, OK–112B, AK–112B and 12P–201 (FIGURE 6). Thus, in "transmit keyboard," the transfer pulse to the printer occurs upon the firing of the first distributor tube via the normally closed contacts K–710F and, in "transmit store," the transfer pulse to the printer occurs upon the firing of the second distributor tube via the normally open contacts K–710F.

*Printer structure*

With reference to FIGURES 9 and 10, the printer unit 52 has a support frame comprised of a base plate 201 upon which, in vertical parallel relation, are rigidly secured a left-hand bearing support plate 203, a right-hand bearing support plate 204 and a cable drum bearing support plate 205. Intermediate the left-hand support plate 203 and the cable drum support plate 205 and adjacent the rear of base plate 201 are a motor support plate 206, a motor mounting bracket 207, a left-hand function shaft support plate 208 and a right-hand function shaft support plate 209, all of which are vertically disposed in parallel relationship with support plates 203, 204 and 205. All of the support plates are secured to base plate 201 by screws 202 and tight fit locating pins (not shown).

As seen from the front of the printer 52 (FIGURE 10), a typewheel positioning and support shaft 212 passes through and is journalled on bearings inset in the left and right-hand support plates 203 and 204. Two collars 213 and associated washers 214 are secured on the right-hand end portion of type wheel shaft 212, one collar and washer on either side of the right-hand support plate 204, by set screws to maintain the axial position of typewheel shaft 212. Although a single set screw may be used, two angularly offset screws are preferred for all units described herein as being secured by set screws. The intermediate portion of shaft 212 has a uniform square shaped cross section whereas the end portions are cylindrical. In lieu of a square cross section, splines or keyways may be used. Disposed on the right-hand cylindrical portion of shaft 212 between the right-hand support plate and the intermediate square portion of the shaft is a blocking cam assembly 215 which consists of a hub unit 216 secured to rotate with the typewheel shaft 212 by set screws and carrying four cams 218, 219, 220 and 221. As seen in FIGURE 24, the hub portion 216 of the cam assembly 215 has reduced diameter end portions and two external axial slots 223 extending the axial length of the hub. Three of the cam plates, 218, 219 and 221 are centrally apertured and have radially inwardly projecting lugs 224, enabling the cam plates to be positioned on the end portions of hub 216 with lugs 224 disposed in the axial slots 223. One cam plate 218 is placed on the right-hand side of the hub 216 and two cam plates 219 and 221 separated by a spacer member 225 made of bearing material are placed on the other side portion of the hub 216. Cam plate 220 is rotatably disposed on the spacer bearing member 225 between cam plates 219 and 221. After assembly of the cam plates on hub 216, the end portions of the hub are spun tight against the cam plates 218 and 221 to rigidly maintain all plates, spacer and hub as a unit assembly. The shapes, specific relation of blocking portions and specific functioning of the various cam plates will be later described, the cam plates being a print hammer blocking cam 218, a line return cam 219, a line feed-line return cam 220 and a line feed cam 221. Cam plate 221 may or may not be used depending on the type of the line feed system.

Immediately adjacent the sensing cam assembly 215 and also rigidly affixed to the right-hand portion of the type wheel shaft 212 is the typewheel shaft spur gear 226, consisting of a hub member 227 with a noiseless (laminated plastic) gear wheel 228 rigidly secured thereto by rivets. The gear wheel 228, in addition to the rivets, is accurately aligned with its hub 227 by a pinned connection.

An axially slidable typewheel assembly 230 is mounted on the intermediate square portion of and rotatable with typewheel shaft 212. The typewheel assembly consists of a flanged hub 231 having one side formed with an annular reduced diameter shoulder 232. The opposite side of the flanged hub 231 includes a shallow annular abutment 234 and carries a bearing unit 235 disposed with its inner race abutting the abutment 234. The edge of the hub member 231 is spun over against the inner race of bearing unit 235 to secure the unit on the hub. A typewheel 237 with twenty-six alphabetical characters, plus six blank spaces, formed on its periphery at equiangularly spaced intervals, has an inner radial flange 238 with a relatively large diameter central aperture 239 to fit over the hub 231 with radial flange 238 against the hub flange and the aperture 239 disposed on the annular hub shoulder 232. Typewheel 237 is retained and clamped on the hub 231 by a retaining ring 240, apertured to fit closely over the central portion to the hub and overlap the inner flange 238 of typewheel 237, which is secured to the hub flange by screws 241. A split clamp 243 consisting of two identical parts 244 is clamped around the periphery of bearing 235 by upper and lower bolts and nuts. The lower legs 245 of each clamp part 244, extended and provided with facing lateral grooves 246, cooperate to securely clamp a translating cable 250 (to be later described) in grooves 246. By loosening the lower bolts on the clamp, typewheel assembly 230 may be adjusted relative to the cable 250 and along the shaft 212.

Positioned on the left-hand cylindrical portion of the typewheel shaft 212, between the intermediate square portion and the left-hand support plate 203, is a stop wheel assembly 252 consisting of two sixteen tooth ratchet wheels with oppositely disposed teeth, coaxially secured in side by side relation to rotate as a unit. The stop wheel assembly 252 may be an integral unitary wheel or, as is preferable for ease of machining, it can be made of two parts. One part includes a hub 253 with an integral sixteen tooth stop wheel 254, the right-hand portion of the hub being formed as a collar with set screws for securing the stop wheel assembly 252 to the typewheel shaft 212. A second toothed wheel 255 with the teeth faced in the opposite direction to those of stop wheel 254 is disposed over the left-hand portion of hub 253 and rigidly secured to ratchet wheel 254 by rivets 256.

With respect to FIGURES 10, 12 and 22, two double edge pawls 258 and 259 are arranged on the inside of the left-hand support plate 203 and angularly spaced with respect to the stop wheel assembly 252. The uppermost pawl 258 is designated the spacing pawl while the lowermost pawl 259 is designated the marking pawl. Pawl pivot posts 260, provided for pawls 258 and 259, pass through the support plate 203 and are rigidly secured thereto by nuts 261. Each pawl 258 and 259 has a stopping edge, 262 and 263 respectively for engaging the teeth of stop wheel 254 in a manner to prevent wheel rotation. The second edge, 264 and 265 of respective pawls 258 and 259, is disposed in camming relation with the teeth of camming wheel 255. Both pawls 258 and 259 are biased in a clockwise direction (FIGURES 12 and 22) about their pivot pins 260 by springs 266 anchored to spring posts 267 fastened to support plate 203. Spring biased in the clockwise direction, the pawl camming edges 264 and 265 ride against the teeth of the camming wheel 255. Inasmuch as rotation of the stop wheel shaft, as seen in FIGURE 12, is counterclockwise, the teeth of camming wheel 255 will pivot the two pawls 258 and 259 against spring bias. When the camming edges ride up on the camming wheel teeth, the pawl stop edges 262 and 263 are positioned immediately in front of a tooth on the stop wheel 254. Pawl 259 is in such a position in FIGURE 22. When the camming edge drops from a tooth on the camming wheel 255, the pawl spring pivots the pawl to remove its stop edge from in front of a tooth on the stop wheel 254. The two pawls 258 and 259 are so angularly positioned relative to the stop wheel assembly that stopping engagement of edge 262 of pawl 258 against the front side of a ratchet tooth on wheel 254 will stop rotation of the typewheel shaft 212 at a position where the edge 263 of pawl 259 is half way between two adjacent teeth on the ratchet wheel 254. This relationship may be seen in FIGURE 22. Thus, using two pawls and a sixteen tooth stop wheel 254, thirty-two distinct stop positions of the typewheel shaft 212 can be obtained. The importance of the camming positioning of the stop pawls will become apparent hereinafter.

As clearly shown in FIGURE 10, both of pawls 258 and 259 are similarly shaped in the form of a U with the open end of the U adjacent the pawl lever which contains edge 264 or 265. Rigidly secured, as by brazing or spot welding, across this end of each pawl 258 and 259 is a solenoid armature plate 269 and 270 respectively.

Solenoid brackets 272 and 273 are fastened by screws to the left-hand support plate 203 in close proximity to respective armature plates 269 and 270. A space solenoid E–801 is secured in bracket 272 with its core aligned with, in the path of movement of and slightly spaced from the armature plate 269 and, when energized, will hold pawl 258 in its counterclockwise position with its stop edge 262 in position against ratchet wheel 254 to engage the next approaching tooth and stop rotation of the typewheel shaft 212. A mark solenoid E–802 is secured in bracket 273 in the same relationship to armature plate 270 and, when energized, will hold pawl 259 in its counterclockwise position with edge 263 against the periphery of stop wheel 254, to engage the next approaching tooth and stop the typewheel shaft 212 at a position intermediate the positions that pawl 258 would stop the rotation of the typewheel shaft. The pawls 258 and 259 are pivoted to a stop position for every one of the sixteen teeth on the stop wheel 254 by the camming wheel 255. This action places the respective armature plates 269 and 270 closely adjacent the respective solenoids E–801 and E–802. If at any time either solenoid is energized, the armature and pawl are positively placed close to the solenoid and the full solenoid strength is used to hold the pawl against its spring bias. In other words, the solenoids do not have to exert a high magnetic flux over a large air gap to pivot the pawls, they merely hold the pawls after they are positively pivoted to a stop position.

As will be explained in the section of this specification devoted to printer operation, whenever a character is selected to be printed, either the mark or the space solenoid will be actuated, and the angular increment of typewheel rotation where solenoid actuation occurs will be determined by a pre-selected signal controlled by commutators mounted at either end of the printer unit, as now described.

A space commutator S–801 is fastened to the left-hand side of the printer unit and a mark commutator S-802 fastened to the right-hand side of the printer unit. Each commutator consists of a dielectric flat plate 282 centrally apertured at 283 and with corner mounting holes 284, as seen in FIGURES 14 and 15. The dielectric plates 282 are similar for both the mark and space commutator. As shown in FIGURES 9, 10 and 13, left-hand commutator plate 282 is disposed with its central aperture 283 over the left end of typewheel shaft 212 and is fastened at each corner to the left-hand support plate 203 by screws 285 passing through spacers 286.

At the right-hand side of the printer unit 52, a commutator plate mounting bracket 287 is fastened by screws to the top edge of the right-hand support plate 204. The right-hand commutator plate 282 is fastened through holes 284 at its upper corners to the bracket 287 by bolts and nuts 288, being spaced from the bracket by spacers 289. The lower corners are fastened to the right-hand support plate 204 in a manner similar to that described for the left-hand commutator plate 282.

With reference again to FIGURES 14 and 15, each commutator plate 282 is preferably made of laminated melamine fiber glass with a melamine paper surface. The commutator side of plate 282 (FIGURE 14) is provided with a flush plated circuit. A suitable plated circuit can have a base consisting of 0.0015 inch nickel surfaced with 0.000020 to 0.000040 inch rhodium with the surface of plate and circuit smoothly finished by buffing. The rear surface of plates 282 is provided with plated segment connecting circuits which may be either flush or raised as desired. The circuits on the rear side include leads to terminals A, B, C, D, E, F, G and H for the space commutator plate and to terminals A′, B′, C′, D′, E′, F′, G′, and H′ for the mark commutator plate. The circuits on front and rear of each plate are interconnected through the plate by rivets 290. The plated commutator circuits are arranged in two concentric discontinuous annular rings, the inner ring being separated into four 90° segments 292, 293, 294 and 295 which, through the rear face printed circuits, are respectively connected to terminals C, D, F and G. The outer ring of commutator segments shown in FIGURE 14 consists of twelve segments so disposed on the face of the plate and interconnected by rivets and the connecting circuits on front and back as to comprise four circuits 296, 297, 298 and 299 which, through their interconnections, correspond respectively to terminals H, A, B and E. Each of printed circuits 296 and 299 consists of two large surfaces diametrally disposed one on either side of the commutator plate aperture whereby at least a portion of each circuit 296 and 299 angularly overlaps, and is radially disposed relative to a portion of each of the four inner segent circuits 292, 293, 294 and 295. In a similar manner it will be noted that each of circuits 297 and 298 has four segments, one segment of each circuit being in radial alignment and spaced adjacent each of a respective one of the inner segment circuits 292, 293, 294 and 295. The arrangement of the two annular series of circuit segments as seen in FIGURE 14 is such that a dual interconnected commutator wiper brush, rotated 360° so as to contact both the inner and outer annular rows of segments, will successively engage the inner segments 192 through 195 and during each 90° of movement when one arm of the brush is contacting one of the inner segments, the second arm of the brush will contact each of the four outer segment circuits. Alternate 90° of travel of the commutator brush repeat the same process in reverse order, thereby providing sixteen separate combinations of bridged circuits for a set of eight commutator terminals.

Each end of the typewheel shaft 212 projects a short distance beyond the commutator plates 282. Fastened to the left-hand end of the typewheel shaft 212 is left-hand rotor assembly 302 and fastened to the right-hand end of shaft 212 is the right-hand rotor assembly 303. Rotor assemblies 302 and 303 are complementarily identical, hence the component elements of both rotor assemblies will be designated by similar reference characters. Each rotor consists of a hub 304 fitted on the typewheel shaft and keyed thereto by set screws, a rotor insulator 305 fixed to rotate with hub 304 by a strong, temperature and moisture resistant adhesive, and a rotor brush arm 306 preferably made of spring tempered Phosphor bronze. Rotor arm 306 has two integral radially spaced trailing brush arms 307 and 308. The brush arms 307 and 308 are slightly bent away from the insulator 305 and their tip ends 309 and 310, respectively, have a further bend in the same direction and are serrated to form a multiplicity of small spring fingers.

With respect to FIGURES 9 and 13, it will be seen that a rotor assembly 302 in operation will rotate with the typewheel shaft and the brush fingers 309 will be spring pressed against the inner ring of the circuit segments on the commutator plate whereas the outer brush fingers 310 will be spring pressed to follow a path around the outer ring of circuit segments on its commutator plate. Thus, as seen in FIGURE 14, there will be sixteen angular positions of the rotor assembly relative to the commutator plate 282 wherein the integral rotor arm with the two brush fingers 309 and 310 will provide a bridging connection between sixteen different combinations of inner and outer commutator segments taken two at a time. Through the control circuit, as will be described, the left-hand space commutator S–801 will control the angular position at which the space solenoid E–801 holds the spacing pawl 258 to engage the toothed stop wheel 254 and stop rotation of the typewheel shaft 212. The right-hand mark commutator S–802, interrelated through the control circuit with the mark solenoid E–802, holds the marking pawl 259 to engage the stop wheel 254 and stop the typewheel shaft 212 at positions intermediate the stop positions associated with the spacing pawl 258. The connection of collars, sensing cam assembly, spur gear, and stop wheel assembly to the square shaft 212 is preferably made with two angularly offset clamping screws against flat surfaces formed in the cylindrical portions of the typewheel shaft 212 to assure positive and accurate radial positioning of such units relative to the square portion of the shaft.

*The Print Hammer Assembly* includes a shaft 314 parallel with the typewheel shaft 212 and journalled at its ends in bearings positioned in the left-hand support plate 203 and the right-hand support plate 204 near their lower forward corners. The intermediate portion of print hammer shaft 314 is of square shaped cross section with the corners of the square section being chamfered. A spring retaining ring is fixed to one end of shaft 314 on the outer side of support plate 204 and, together with a collar 315 disposed on the inner side of the support plate 204 and fixed to shaft 314 by set screws, maintains an accurate axial position of the print hammer shaft.

A print hammer lever 316, including an upwardly extending lever arm 317 and a lower arm 318, has its midportion bent in a U-shape to provide two arms apertured with square holes for slidable disposition on the square portion of print hammer shaft 314. The lower arm 318 is integral with the bight or midportion of the U-shaped part of lever 316 and has an aligned semi-perforation that provides a protruding boss 319 and a hole 320. A small plate member 321 with a tapped opening aligned with the hole 320 in lower arm 318 and with a grooved upper edge cooperating with the boss 319 is bolted and aligned relative to the lower lever arm 318. The hammer lever 316 will be positioned on the hammer shaft 314 so the upper arm is directly aligned with the characters on the typewheel periphery and in this position the lower arm 318 and plate 321 clamp on a portion of the cable 250 remote from that portion of the cable 250 clamped by the typewheel assembly clamp 243. The upper end of the print hammer upper lever arm 317 is apertured and fits in a slot 323 formed in the body of a print hammer head 324 made of softer material than the type characters. The hammer head 324 is bolted to the end of the upper lever arm 317 with its striking face substantially parallel to a radial plane through the axis of shaft 314 and the hammer head face. Actually the hammer face 225 is so disposed as to strike squarely against the face of a raised character on the typewheel periphery when the hammer shaft 314 is pivoted to move the hammer head 324 toward and into engagement with the typewheel 237.

On the right-hand cylindrical end portion of the print hammer shaft 314 between the squared intermediate portion and the right-hand support plate 204, a print hammer blocking sensing lever 327 is tightly clamped by its split U-shaped midsection 328 with a clamping screw 329. One side of the U-shaped central section 328 includes an upwardly extended arm 330 and a rearward, downwardly curved arm 331, the upper arm being bent laterally at its tip and including a rearwardly extended finger 332 whose path of movement lies directly in the path of rotation of the print hammer blocking cam 218 in the blocking cam assembly 215. The lower end of the rear curved finger 331 includes a laterally projecting stud 333 disposed in the forked end 334 of a printing lever 335. The forked end 334 is integral with the forwardly directed lever arm 336 of the printing lever 335 which is bent into a U-shape with arms disposed on either side of the cable drum bearing support plate 205 and journalled on a pivot pin 337 passing through the drum support plate 205. The forward arm 336 of lever 335 is disposed on one side of the U-shaped center portion while a rearwardly directed arm 338 is on the opposite side of the U-shaped midportion and extends rearwardly adjacent the right-hand side of the cable support plate 205 terminating in a rounded upwardly directed print cam follower 339. Cam follower 339 abuts the periphery of the print cam in the rotating function system, to be later described. The forward lever arm 336 is biased by a spring 340 anchored to a spring post 341 fastened in the base plate 201 so cam follower 339 is always biased to ride against its print cam permitting the printing cam lever 335 to be spring biased counterclockwise, the cooperation of forked end 334 with stud 333 will, through blocking sensing lever 327, cause rotation of the print hammer shaft 314 and subsequent impact of the hammer face 325 against the page material in front of the typewheel, unless blocked by cooperation of blocking sensing lever 327 with the print blocking cam 218.

With respect to FIGURE 26, it will be seen that the print hammer blocking cam 218 includes six radially projected fingers 344 which are pre-arranged angularly to coincide with the blank spaces on the typewheel 237. When the typewheel is stopped so a blank space is aligned with hammer face 325, one of the lugs 344 on the print hammer blocking cam 218 will lie in the path of the blocking sensing lever rear finger 332 (FIGURE 17) and the cam lug 344 will limit the pivotal movement of the print hammer shaft 314 under the bias of spring 340 so the hammer head cannot move a sufficient distance for the hammer face 325 to strike the page material in front of the typewheel.

*Function Shaft System.*—With respect particularly to FIGURE 17 and generally to FIGURES 9–12, the power for operating the functions of printing, typewheel positioning and spacing, line feed and typewheel return (hereinafter termed line return) is derived from a small three phase induction motor B-801 operating on a 400 cycle 115 volt alternating current source. Motor B-801 has integral gear reduction with a shaft 350 projecting from one end, which end is fastened by means of screws 352 to the motor mounting bracket 207 with shaft 350 projecting through a central aperture in the bracket. A spur gear 353 is fixed by set screws to the end of motor shaft 350. The right-hand end of motor B-801 (FIGURES 9 and 12) is disposed in a semi-circular cutout in the motor support plate 206 and held therein by means of a clump 354 which partially encircles the motor housing and is fastened to plate 206 by screws 355.

Positioned vertically above the axis of the motor shaft 350 and journalled by a bearing 356 in the left-hand function shaft support plate 208 is a spur gear shaft 357 having fastened at one end a noiseless laminated plastic spur gear 358 meshed with the motor drive spur gear 353. The collar of spur gear 358 is fastened to shaft 357 by set screws. On the other end of spur gear shaft 357 is a hardened steel spur gear 360 secured by set screws and providing the drive end of a positive action clutch assembly 361. The driven element 362 of clutch 361 is secured by set screws to one end of a function shaft 363 which is journalled by bearings aligned with the spur gear shaft 357 in the right-hand function shaft support plate 209 and in the rear portion of the cable drum bearing support plate 205. Function shaft 363 is maintained in axial position by abutment of an integral collar 365 with the inner race of the bearing at the outer side of the cable drum support plate 205 and by a collar 366 secured on the function shaft 363 adjacent the inner side of the cable drum bearing support plate 205 by set screws.

The collar 366 includes a radial flanged plate 368 which serves a two-fold purpose. The periphery of plate 368 has a single cam rise 369 (FIGURE 17) which coacts with a line feed cam follower 370, as will be later described, and also serves as the fixed plate for a friction clutch 371 consisting of a floating gear wheel 372 freely journalled on the function shaft 363 and pressed by two friction discs 373 between the fixed plate 368 and an axially shiftable plate 374 which is in splined engagement with a collar 375 secured to the function shaft 363 by set screws. A compression coil spring 376 is disposed between collar 375 and plate 374, biasing the plate 374 toward the fixed plate 368 and thereby compressing the friction discs 373 against the floating gear wheel 372. Plate 374 also serves as a function shaft stop sensing cam which controls the contacts of a switch assembly 377 fastened on the back edge of the right-hand function shaft bearing support plate 209 by screws. Switch assembly 377 is a dual switch composed of a normally closed switch S–803 and a normally opened switch S–805 when the function shaft is in its stop position. Upon initiation of rotation of the function shaft 363 by engagement of the positive clutch assembly 361, the rise of cam plate 375 will pass from control of switch assembly 377 permitting sensing switch S–803 to close and sensing switch S–805 to open. Just prior to one complete revolution of the function shaft 363, the cam rise of plate 374 again controls the switch assembly 377 causing the sensing switch S–803 to open and the sensing switch S–805 to close and shortly thereafter the positive action clutch assembly 361 will automatically be disengaged at the end of one complete revolution. The purpose and function of these switches will be fully described in conjunction with the control circuit description.

When the function shaft 363 is in its stop position, a detent notch 380 at the then forward portion of cam plate 374 comes into coaction with a spring plate 381 fixed in a bracket 382 mounted on the base plate 201. This detent spring plate and detent notch provide assurance that positive action clutch assembly 361 will remain disengaged. This may be seen in FIGURE 10.

A group of three cams 385, 386 and 387 separated by spacer plates 388 are splined and secured to the function shaft 363 adjacent the conical collar 365 by a nut 389 and lock washer 390. These cams are best seen in the exploded perspective view of FIGURE 17 but are also shown in FIGURE 11. The function shaft 363 extends beyond nut 389 and freely journals a cable drum assembly 392. The cable drum assembly 392 consists of a drum 393 with an integral hub containing a bearing disposed on the end of function shaft 363 against a spring clip 394 fastened in a groove in the function shaft. The opposite side of the drum 393 is open and receives a clock type coil spring 395 having its outer tail disposed in a radial slot 396 through the drum periphery. The central portion of the coil spring side of drum 393 includes an enlarged aperture which rotatably receives the hub of a spring winding bracket 398 having three radially extending arms 399. Intermediate each of the arms 399 is a laterally directed lug 400, one of which cooperates with the inner end of coal spring 396 to constitute an anchor and providing means for prewinding the spring. Contained within the winding bracket hub is a bearing 404 journalled on the end of function shaft 363. The function shaft projects a slight distance beyond the spring winding bracket 398 and is journalled in a bronze bushing 402 inset in an auxiliary function shaft support bracket 403.

The open side periphery of drum 393 is recessed at 405 to receive a hardened steel cam segment 406. Fastened to the support bracket 403 by screws is a single switch assembly 407 having its contacts arranged as a switch S–804 to be actuated by the cam segment 406 to a closed position to energize a circuit indicating the approach of the end of line position of the printer typewheel which lights the indicating lamp I–702 on the keyboard 50.

Fastened to the left-hand side of the cable drum 393 is a stepping ratchet wheel 410 having a plurality of ratchet teeth around its periphery adapted to the engaged to rotate the drum clockwise as viewed from the right-hand side (FIGURE 11). Ractchet wheel 410 is fastened to the drum by rivets, and fastened to the side face of the ratchet wheel 410 is a camming stud 411, whose purpose will be later described.

With respect to FIGURE 11, a ratchet stop pawl 412 provided with a U-shaped midportion is journalled on a stud 413 fixed to the cable drum bearing support plate 205. The pawl arm includes a knife edge lug 414 aligned with and adapted to engage the teeth of ratchet wheel 410 to prevent reverse rotation of the ratchet wheel and drum under the force of coil spring 396. Stop pawl 412 is biased into engagement with the ratchet wheel teeth by a spring 416 anchored to spring post 417 so clockwise rotation of the cable drum 393 will cause the ratchet wheel 410 to ratchet past the stop pawl edge 414, but will prevent counterclockwise rotation of the cable drum. The upper end of the stop pawl 412 has an upwardly directed finger 418 which is adapted to be engaged by a stop pawl release lever (to be described) that will forcibly pivot the stop pawl 412 against its spring bias out of detent engagement with the ratchet wheel 410 thereby permitting rotation of the cable drum under the force of coil spring 396 to a limit position determined by abutment of the camming stud 411 against a stop plate 419 that is fastened to the rear edge of right-hand support plate 204 by screws. This stop position, by reason of the coordinated engagement of the typewheel assembly 230 and the print hammer lever 316 with the cable 250, determines the start of line position at the left-hand side of the typewheel shaft 112 and the print hammer shaft 214.

Cable 250 is preferably double twisted multiple strand steel aircraft cable and is coiled several times around the cable drum 393, the cable passing off the lower portion of the drum toward the forward part of the printer assembly (FIGURES 10 and 13) and around a horizontally disposed pulley wheel 422 mounted on a pulley post 423 fixed in the base plate 201. Cable 250 then passes horizontally to a second pulley 424 arranged for rotation on a horizontal axis with its pulley shaft 425 fixed in a bracket 426 secured to the inner side of the left-hand support plate 203. Passing over pulley 424 cable 250 reverses its direction and passes horizontally behind the print hammer shaft 314 to the righthand side of the printer and around a third pulley 428 arranged on a vertical axis pulley post 429 mounted on a bracket 430 secured to the inside of the right-hand support plate 204. The print hammer wire clamp plate 321 is clamped to the horizontal stretch of cable immediately behind the print hammer shaft 314.

Cable 250 passes around pulley 428 to reverse itself and again pass horizontally to the left-hand side of the printer where it passes around a fourth pulley wheel 432 having its axis arranged horizontally, and journalled on pulley post 433 fixed in a bracket 434 secured to the inside of the left-hand support plate 203. Cable 250 passes on around the pulley 432, reversing itself again and extending to the right-hand side of the printer where it makes a quarter turn on a pulley 436 having its axis slightly inclined so cable 250 will pass from a horizontal path to a path tangent to and over the upper surface periphery of cable drum 393. Pulley 436 is mounted on a pulley post 437 fixed in the pulley bracket 438 which is secured to the outer side of the right-hand support plate 204. The typewheel bearing clamp 243 is secured to the horizontal stretch of cable that passes between pulleys 432 and 436. Note that a fixed increment of the cable 250 between pulleys 424 and 428 will translate in synchronism with a fixed increment of the cable between pulleys 432 and 436. Therefore, if the print hammer lever 316 and the typewheel bearing 235 are clamped at aligned vertical positions on their respective stretches of cable 250, their longitudinal movement will be directly synchronized.

In the "start of line" position, as determined by abutment of the cable drum camming stud 411 against the stop plate 419, the typewheel and print hammer will be in the position shown in FIGURE 10. In this position the lowermost stretch of cable 250 includes the cable ends seen at the right-hand side of the printer. Eye members 440 are swaged and soldered to each end of the cable 250 and are connected by a spring 441 to provide proper tensioning in the cable rigging. Looking now at FIGURE 11, clockwise rotation of the cable drum 393 will pull the upper stretch of cable back over the drum. This moves the uppermost stretch of cable 250 (FIGURE 10) to the right and will simultaneously move the typewheel assembly 230 to the right. The stretch of cable 250 immediately below moves to the left which pulls the stretch of cable 250 immediately behind the print hammer shaft 314 to the right, causing the print hammer lever 316 to move immediately in front of the typewheel assembly 230. By structure which will be described, the cable drum 293 is moved one tooth at a time which, as described, indexes the typewheel and print hammer toward the right one character space.

*Function Shaft Positive Clutch.*—The structure and functioning of the positive clutch 361 will be described with reference to FIGURES 10, 11, 17 and 18–21. When the printer is conditioned, through the control circuit, for operation, the motor B–801 is continuously operating to constantly rotate the driving element of clutch 361, the spur gear 360 through the shaft 357, the noiseless gear 358 and the motor spur gear 353. With the clutch 361 engaged (FIGURE 19) spur gear 360 is drivingly engaged with the driven element 362 through pawls 446. The clutch driven element 362 is secured to positively drive the function shaft 363 whenever the clutch is engaged. Driven element 362 consists of a flanged hub 447 with a collar 448 at one side secured by set screws to function shaft 363. There are two axially directed pawl pivot posts 449 fixed at diametral positions on the opposite side of flange 450. Posts 449 are force fitted in mating holes provided in flange 450 and brazed or otherwise rigidly fixed in position. Each post 449 has a first annular shoulder 451 that abuts the face of flange 450 and immediately adjacent thereto a smaller diameter shoulder portion 452. A circular clutch kick-out plate 453 has two circumferentially slotted, diametrically disposed apertures 454 so the circular plate 453 can be mounted with apertures 454 fitting over pivot post shoulders 452 to rest on shoulders 451. The slotted apertures 454 permit the kick-out plate 453 to have a slight increment of relative coaxial rotation with respect to hub 447. The thickness of kick-out plate 453 is less than the depth of shouldered portion 452 so a pawl member 446, disposed on post 449 for pivotal movement, will rest against the shoulder 452 but will not bind kick-out plate 453. Clips 456 fit in grooves on each of the posts 449 to axially retain the pawl members 446 thereon. Pawl members 446 are arcuately shaped and in assembly are positioned to pivot about posts 449 toward and away from engagement with the teeth of spur gear 360. The non-pivoted end 457 of each pawl is apertured and receives a camming pin 458 force fitted through the aperture and fixed to the pawl by brazing or other suitable means.

Shown in FIGURE 21, the left end 459 of cam pin 458 projects a short distance from the side of the pawl and when the clutch is assembled the camming ends 459 are disposed in diametrically opposite, similarly inclined slots 460 disposed in kick-out plate 453. The ends of pawl pivot posts 449 and pawl camming pins 458 are grooved to provide spring retaining anchors and (FIGURE 18) a coil spring 462 is connected between each set of a pawl pivot pin 449 on one pawl and the pawl camming pin 458 on the other pawl. Coil tension spring 462 thus tends to pull the free end of each pawl toward the pivoted end of the other pawl thereby moving each pawl toward engagement with the driving gear 360. A driving tooth 463 is integrally formed on each pawl 446 at the center of the inner arcuate edge and, when the pawls are permitted to be spring biased into engagement with spur gear 360, the opposed pawl teeth 463 mesh with the teeth of clutch spur gear 360. Rotation of gear 360 is counterclockwise and, in the clutch engaged position (FIGURE 19), will exert a pulling force on the pawl pivot posts 449.

Whenever the kick-out plate 453 is unrestrained, the force of springs 462 and the camming end 459 of cam pins 458 on the kick-out plate slots 460 will cam the kick-out plate 453 counterclockwise to the limit position determined by coaction of the ends of the arcuate slots 454 with the shoulder portion 452 of pivot post pins 449. In this position the camming pins 458 are at the innermost end of the kick-out plate cam slots 460 and the pawl teeth 463 are diametrically meshed with the driving gear 360.

When clutch mechanism 361 is rotating and the kick-out plate 453 is suddenly blocked, the inertia of the driven hub member 447 and function mechanisms connected to the function shaft 363 cause the function shaft to tend to continue rotation and the fixed pawl pivot posts 449 will move from their position in the kick-out plate arcuate slots 454, as shown in FIGURE 19, to the other end of the arcuate slots 454 as in FIGURE 18. Because of the fixed distance relationship between the pawl pivot posts 449 and the mated pawl camming pin 458 for each pawl, each camming pin end 459 must move toward the outer end of its camming slot 460 in the kick-out plate, which movement causes the two pawls 446 to separate against the force of springs 462 causing disengagement of the pawl teeth 463 from spur gear 360, thereby disengaging positive drive between the clutch spur gear 360 and the clutch hub 447. Frictional inertia of the mechanism attached to function shaft 363 will prevent a reversal of rotation of the function shaft which would permit re-engagement of the clutch pawl lugs 463 with the spur gear. To assure against any tendency for the function shaft to reverse slightly the previously referred to detent notch 380 on the friction clutch camming plate 374 coacts with the spring plate 381 and positively prevents function shaft reversal.

To enable blocking of the rotation of the kick-out plate 453, a stop lug 465 is formed at one point on the periphery of plate 463, the leading edge of lug 465 lying in a plane passing through the axis of rotation of the clutch assembly. Blocking of the kick-out plate 453 is controlled through a solenoid actuated stop bracket 466 pivoted on a pivot post 467 secured to the inside of the left-hand function shaft support plate 208. Also fastened to the same side of plate 208 is a bracket 468 that carries an adjusting screw 469 and provides an anchor for a stop bracket biasing spring 470. The stop bracket 466 includes a substantially horizontally projected finger 472 and a downwardly disposed plate portion 473 with two bent up side ears journalled on the pivot post 467 and retained there by a spring clip. The horizontal finger 472 has a leading edge 475 which, when the stop bracket 466 is biased by spring 470 to cause the finger 472 to rest against the periphery of the kick-out plate 453, will lie in blocking relation to the face of the kick-out plate lug 465. The downwardly projected portion of the stop bracket 466 includes an anchor for one end of spring 470 and also carries an armature plate 476 which is rigidly secured thereto.

Shown in FIGURE 18, the stop bracket 466 is biased into blocking poistion against the kick-out plate under force of spring 470, in which position the armature holding portion 473 of bracket 466 abuts the adjusting screw 469. Screw 469 is adjusted so the lateral finger 472 does not actually ride against the periphery of the kick-out plate but, in the biased position, will be disposed closely adjacent the plate periphery and in the path of the kick-out lug 465. Disposed immediately in front of the stop bracket 466 is a clutch actuating solenoid E–803 secured to a U-shaped solenoid bracket 478 fixed as by spot welding to angle bracket 479 which is fastened to base plate 201. Solenoid E–803 is positioned with its core pole face closely adjacent the armature plate 476 so a proper air gap is provided between the core and armature plate permitting maximum magnetic flux concentration between the core and armature plate yet, as seen by comparison of FIGURES 18 and 19, permitting sufficient pivotal operating movement of the stop bracket 466 to remove its blocking edge 475 from the path of kick-out plate lug 465.

Actuation of solenoid E–803 is momentary and is accomplished by a start signal from a control system, as has been described, after receipt of a signal combination by the printer matrix. The momentary energization of solenoid E–803 releases the clutch kick-out plate 453 permitting positive clutch 361 to engage and rotate the function shaft 363 in the printer 52. Upon solenoid de-energization, the stop bracket 466 is again biased by spring 470 against the adjusting screw 469 to place its blocking edge 475 in the path of kick-out plate lug 465 thereby causing the clutch to disengage after one complete revolution. Note the actual stop position of the function shaft occurs within a small angular increment after the kick-out plate lug 465 abuts the stop bracket edge 475. This angular increment will be equal to the distance of travel of the pawl pivot post 449 permitted by the arcuate slots 454 in the kick-out plate 453.

Solenoid E–803 is termed a transfer solenoid because its relationship between the control circuit and the printer initiates the procedure of transferring a code signal manifestation from the printer matrices to a mechanical operation in the printer.

Positive rotation of function shaft 363 occurs each time the transfer solenoid E–803 is energized and the clutch remains engaged for a 360° rotation. The function shaft 363, friction clutch pressure plate 374 (stop sensing cam), friction clutch fixed plate 368 (line feed cam), spacing cam 385, printing cam 386, and line return cam 387 are positively rotated for 360° and the friction clutch floating gear 372 frictionally urged to rotate during such positive function shaft rotation, although its exact increment of rotation will be varied depending on the character selection of the typewheel shaft.

The floating gear 372 of friction clutch 371 furnishes the power to rotate the typewheel shaft 212 and is meshed with an idler pinion 481 (FIGURE 9) journalled on a stud 482 that passes through and is fixed to the cable drum bearing support plate 205 by a nut 483. Idler pinion 481 is in turn meshed with the typewheel shaft spur gear 226. Thus, rotation of function shaft 363 by engagement of positive clutch 361 will drive the typewheel shaft 212 through the friction clutch 371 until one of the stop pawls 258 or 259 is controlled by a received signal permutation to engage the stop wheel 254, at which point the friction clutch 371 will slip and the function shaft 363 will continue to rotate until the positive clutch is disengaged by abutment of the kick-out plate lug 465 against the stop bracket edge 475. The friction clutch floating gear 372 has 53 teeth and the typewheel shaft gear 226 has 37 teeth which ratio enables the typewheel shaft to be rotated at least one full revolution for approximately 252° of rotation of the function shaft. As will be apparent with reference to the timing chart shown in FIGURE 27, this permits a possible scanning of all of the mark or space commutators before the printer cam operated functions occur, to enable a signal selection to be accomplished for typewheel shaft positioning before the printing and spacing operation occur or before the functions, such as line feed and/or line return, occur.

*Typewheel Spacing* is accomplished through coaction of spacing cam 385 with a line spacing lever 484, illustrated in FIGURES 9, 11, 17 and 24. Note, in the perspective view FIGURE 17, the relative positions of the various cams on the function shaft 363 and typewheel shaft 212 have been changed to afford greater clarity in viewing. Line spacing lever 484 includes a bearing hub journalled on a stud 485 fixed in the cable drum bearing support plate 205 above the function shaft 363. Viewed in FIGURES 11 and 24, the left arm of lever 484 is formed as a cam follower 486 that rides on the periphery of cam 385. The right-hand arm 487 of lever 484 is formed in a dog leg with a stud 488 fixed to project laterally from the dog leg bend and a spring post 489 secured to the end of the dog leg arm. A spring 490 is connected between dog leg arm 487 and a spring post 491 fixed in support plate 205 above the lever 484 to bias the lever 484 counterclockwise with its cam follower 486 abutting the spacing cam 385.

Journalled on stud 488 is a double arm feed pawl 493. Depending arm 494 includes a laterally bent tip with a beveled pawl edge 495 provided thereon and projected across the toothed peripheral edge of the cable drum ratchet wheel 410. A spring 496 connected between a short ear 497 on feed pawl 493 and the spring post 489 on the spacing lever 484 biases the feed pawl 493 clockwise with pawl edge 495 engaging the teeth of ratchet wheel 410.

Cam 385 has one rise on its periphery and every time the function shaft makes one revolution the cam rise coacts with the follower arm 486 of the spacing lever 484 to pivot it clockwise from a normal position and permit its return to normal under bias of spring 490. Such pivotal reciprocation of lever 484 moves the feed pawl 493 downward to engage and rotate the drum ratchet wheel 410 one tooth space. Ratchet wheel 410 is held in its new position by the ratchet stop pawl 412 while the feed pawl 493 returns to its normal position, ratcheting over the ratchet wheel teeth when the spacing lever 484 is returned to its normal position. As previously described, such rotation of the ratchet wheel will rotate the cable drum, moving cable 250 with the typewheel assembly 230 and hammer lever 316 one space to the right and winding the cable drum coil spring 395. This function occurs immediately after the print operation, as is shown in FIGURE 27.

The feed pawl has a forwardly extended arm 498 that, in conjunction with the position of the bent pawl arm that includes pawl edge 495 in front of the upstanding finger 418 on the ratchet stop pawl 412, constitutes part of the line return mechanism, the function of which is described under a later sub-section describing the line return mechanism.

*Printing* is accomplished by cam 386. As previously described, the print hammer lever 316 is fixed to a pivotable print hammer shaft 314 whose normal position maintains the print hammer 324 spaced in front of the recording medium and the typewheel assembly 230. A print blocking sensing lever 327 fixed to print lever shaft 314 is pivotally connected to a printing lever 335, biased by a spring 340 so its cam follower 339 bears against the periphery of the print cam 386.

Spring bias normally tends to pivot the hammer 324 toward the typewheel but the cam 386 maintains the print lever shaft 314 pivoted against the spring bias. After rotation of the function shaft approximately 275° (FIGURE 27), which enables the typewheel shaft 212 to be positioned as selected by the permutated signal from the control matrices, the print cam 386 has a sharp drop 499 which permits the cam follower 339 to move upward under bias of spring 340, rapidly pivoting lever 335 counterclockwise with a resulting clockwise rotation of lever 327 and shaft 314 causing the hammer 324 to strike a sharp blow on the recording medium against the selected typewheel character. This action occurs for all positions of the typewheel excepting the six blank spaces. As described previously, if the typewheel shaft 212 is positioned to present a blank typewheel space to the print hammer, a lug 344 on the print blocking cam 218 (FIGURES 26 and 17) will be positioned in the path of the print blocking lever 327 and prevent the print hammer shaft 314 from completing a pivotal printing movement.

Continued function shaft rotation immediately shifts the print lever cam follower 339 to pivot the print hammer shaft 314 back to its normal position against bias of spring 340.

*Line Feed.*—As previously explained, the recording medium upon which visual character representations are made is a pressure sensitive paper having a dark surface, preferably black, covered with a microscopic film of a light colored material. With reference to FIGURES 9–12 and 25, the recording paper 501, its path of movement and the mechanism for feeding the paper line by line will be described. A roll 502 of paper is carried in the printer and the paper may have its edges perforated for sprocket feed if desired.

In FIGURES 9 and 10, phantom lines 501 indicate the projected strip of recording paper, the paper and its guide structure being deleted for clarity of other structure. FIGURES 12 and 25 illustrate the paper roll brackets 503 secured to the inside rear portion of the upper edges of support plates 203 and 205 by bolts. Brackets 503 are U-shaped channels having inclined notches 504 in their inside edges. A spring clip 505 is retained on a post 506 in each channel bracket 503 and has its movement limited by abutment against a stop lug 507 punched inwardly from the inside channel flange. A paper roll bushing 508 with a projected stud 509 (FIGURE 25) is inserted in each end of a roll 502 of recording paper, and the studs 509 placed in the inclined notches 504 of brackets 503 under the spring clips 505, to journal the roll.

Illustrated in FIGURE 12, the paper 501 feeds off the roll 502 down into a guide chute 511 that wholly encloses the paper strip and guides it down behind the typewheel assembly 230, forward under the typewheel shaft 212 and under the uppermost stretch of cable 250, then vertically upward in front of a guide rod 512. The paper strip then passes upward between the typewheel periphery and the print hammer 324, to and over a feed roll 513 and out through an appropriate slot provided in the top of a cover 514 illustrated by phantom lines. Guide chute 511 is made from smoothly polished metal and is suitably fastened by brackets (not shown) to the inside of support plates 203 and 205.

Feed roll 513 (FIGURES 10 and 25) is tubular, is coated with a material having a high coefficient of friction, and has end plugs 516 that can be provided with sprocket pins for sprocket feeding of the paper if desired. Set screws, through plugs 516, secure the feed roll 513 to a feed roll shaft 517 journalled in bearings in the support plates 203 and 205. A toothed feed and detent wheel 518 has its hub 519 fixed to shaft 517, by set screws, immediately adjacent the inside of support plate 205. A manual feed wheel 520 with a serrated periphery and fixed hub 521 is secured by set screws to right-hand end of the feed roll shaft 517 and, together with the hub 519 of wheel 518, axially maintains the feed roll position. The edge of manual wheel 520 projects above the top of cover 514 to permit rotation of the feed roll by hand. Feed roll line position is maintained by coaction between a detent roller 522 and the toothed feed and detent wheel 518. Roller 522 is carried by a detent lever 523 journalled on stud 524 in support plate 205 and biased by a spring 525 to press the roller against the teeth of wheel 518.

Pivotally carried on a shaft 527, fixed between the support plates 203 and 205, is a paper pressure roller assembly 528 consisting of a support 529 carrying a shaft 530 with a central roller 531 resting on the top of the feed roll 513. A spring 532 biases the roller assembly in a direction to press the roller 531 and a strip of recording paper 501, passing over the feed roll 513, against the feed roll.

Line feed, as a function of the printer mechanism, is accomplished through a line feed lever assembly that cooperates with line feed cam 369 and line feed sensing cam 221 to ascertain when a line feed function is desired and to then power feed the paper feed roll 513. Rotation of feed roll 513 is a direct result of pivotal movement of a feed lever assembly 534 (FIGURES 9, 10, 11 and 23) consisting of a triple arm lever 535 journalled on the feed roll shaft 530. The upper lever arm 536 has a feed pawl stud 537 rigidly fixed thereto and pivotally carrying a feed pawl 538 biased by a coil spring 539 into engagement with the feed and detent wheel 518. The central lever arm is pierced to serve as an anchor for a spring 541 having its other end anchored to a spring post 542 fixed in the support plate 205. Spring 541 biases the feed lever assembly 534 counterclockwise to a normal limit position against a pin 543 fixed in support plate 205. In such normal limit position pawl 538 abuts a pin 544 and is pivoted out of engagement with the feed and detent wheel 518. The third and lower lever arm 546 carries an actuating post 547.

Pivotally mounted on a stud 548 projecting from the inside of support plate 205 is a cam operated line feed lever 549 having a rearwardly directed arm, whose end is a cam follower 370 biased into engagement with the line feed cam 368 by a spring 551, and an upwardly directed arm 552. The upper arm has a lateral stud 554 and immediately above the stud a post 555. Journalled on stud 554 is a line feed sensing lever 556 with an upper arm 557 disposed in front of post 555 and behind the feed pawl lever actuating post 547. The lower arm 558 has a sensing pin 559 laterally fixed in its end. As illustrated in FIGURE 9, the sensing pin 559 overlies the line feed sensing cam 221 and the line feed-line return sensing cam 220 on the typewheel shaft 212. A spring 560 connected between the feed sensing lever 556 and the lever 549 biases the feed sensing lever 556 clockwise so its upper arm 557 normally rests against the post 555 in the upper arm of line feed lever 549.

Every rotation of the function shaft 363 will, through cam 369 and the line feed cam follower 370, reciprocally pivot the line feed lever 549 and its associated sensing lever 556 without affecting a pivotal movement of the roll feed lever assembly 534. Turning to FIGURE 26, it will be seen that the line feed sensing cam 221 has two blocking fingers 345, one corresponding to each of the line return and line feed positions on the typewheel 237. In this manner a line return signal will automatically result in a simultaneous line feed operation, and a line feed function can be obtained separate from a line return function. If a blocking finger 345 is positioned in the path of sensing lever 556 when line feed lever 549 is pivotally reciprocated, lever 556 is forced to pivot counterclockwise on stud 554, bringing its upper arm 557 into engagement with the post 547 on the feed roll lever assembly 534, forcing lever assembly 534 to pivot clockwise to place pawl 538 into engagement with feed and detent wheel 518 and move the feed roll 513 one notch past the detent roller 522. The surface of feed roll 513, being treated with a high friction material, will advance the recording paper strip 501 a distance equivalent to one line each time the feed and detent wheel 518 advances one tooth past its detent roller 522. The sensing lever 556 reciprocates each time a printer operating cycle occurs and, if the sensing pin 559 is blocked by a sensing cam finger 345, a feed operation will result whereas if the sensing pin 559 is not blocked, no feed action results.

*Line Return.*—As previously noted, return of the typewheel assembly 230 and hammer lever 316 from a position to the right of a start of line position back to the start of line position is termed a line return function. The lever arrangement for accomplishing line return is illustrated in assembly in FIGURES 9 and 11 and in detail in FIGURES 19 and 24.

Power for initiating line return is furnished by line return cam 387 on the function shaft 363. A line return lever 564 is provided and includes a hub journalled on the same stud 485 as is the spacing lever 487. A depending arm 565 has a cam follower 566 resting against the periphery of cam 387. The upper arm of lever 564 includes a lateral stud 567, a bent lug abutment 568 and a spring anchor 569, and a spring 570 is connected between anchor 569 and the aforementioned spring post 491 to bias the line return lever 564 clockwise so its follower 566 bears against the periphery of cam 387.

Pivotally carried on the stud 567 is a line return sensing lever 571 having a midportion serving as an abutment to engage the line return lever abutment lug 568 and limit counterclockwise pivotal movement of the sensing lever 571, under bias of spring 572, relative to lever 564. Viewed in FIGURE 35, the forward arm 573 of sensing lever 571 extends to a position adjacent the sensing cam assembly 215 and carries a sensing pin 574 (FIGURE 9) that overlies the line return sensing cam 219 and line feed-line return sensing cam 220. The rearward arm 575 of sensing lever 571 extends to a position adjacent the forward arm 498 of feed pawl 493 and carries a lateral post 576 that overlies feed pawl arm 498.

Line return lever 564 is pivotally reciprocated each time the function shaft rotates 360° and moves the sensing lever 571 toward the sensing cam assembly 215 and back away from it. Normally the sensing lever 571 will remain abutted against lug 568 of the line return lever 564 and will have no effect upon the feed pawl forward arm 498. However, if the line return sensing cam 219 is positioned with its blocking finger 346 in the path of the sensing pin 574, as will occur when the typewheel shaft 212 is positioned according to a line return signal as is illustrated by dotted lines in FIGURE 24, counterclockwise movement of the sensing lever 571 will be blocked. Since its pivot post 567 is forced to move counterclockwise with the line return lever 564, the sensing lever 571 must pivot clockwise causing its rear arm to move down and, through post 576, pivot the feed pawl 493 counterclockwise out of engagement with ratchet wheel 410. At this position in the timing cycle the spacing cam 385 moves past its follower 486 and the feed pawl 493 starts to move up to a normal position. But since the line return sensing lever post 576 is holding the feed pawl 493 in a counterclockwise pivoted position, the bent lug on feed pawl 493 that contains the pawl edge 495 engages the ratchet wheel stop pawl upper finger 418 and moves it clockwise to release the ratchet wheel 410 which allows the cable drum 393 to rotate under the energy of coil spring 395, returning the typewheel assembly 230 and hammer lever 316 to the start-of-line position. Cable drum rotation under spring force has a limit position determined when the ratchet wheel stud 411 abuts the stop plate 419 (FIG. 11). Note that the line feed sensing cam 219 has one long finger 346 and five short fingers. The long finger 346 is the only finger on cam 219 that is used for a line return function, the short fingers being used for other purposes in modified printers.

*Line Return Latch.*—To assure that the ratchet stop pawl 412 is held out of engagement with the ratchet wheel 410 until the typewheel assembly and hammer lever are fully returned to a start-of-line position, a line return latch assembly 578 (FIGURES 11 and 25) is used to hold the sensing lever post 576 against the forward pawl arm 498 until the start-of-line position is reached. Latch assembly 578 consists of a bracket 579 secured by screws to the top edge of support plate 205 with two upstanding ears 580 and 581 and a depending skirt 582 disposed on the outside of support plate 205. A laterally projected stud 583 is fixed in skirt 582 and pivotally carries a slotted latch lever 584. Adjustably carried in the slotted part of lever 584 is a hook plate 585, normally disposed, as in FIGURE 11, in front of the line return sensing lever post 576. During normal unblocked operation of the line return lever assembly, the latch lever 584, which is biased counterclockwise by a spring 586, will remain in front of the sensing lever post 576 and rock slightly as the sensing lever moves. But when the sensing lever 571 is blocked by the sensing cam assembly 215, post 576 is moved down below the lower edge of latch hook plate 585 which permits the latch lever 584 to swing counterclockwise so the hook plate 585 is above the sensing lever post 576. Pivotal movement of latch lever 584 is limited by adjusting screws 587 and 588 in the upstanding bracket ears 580 in cooperation with a bent lug 589 on the upper end of the latch lever 584.

The lower end of latch lever 584 has a depending cam follower 590 that is engaged by the ratchet wheel stud 411, just prior to engagement of the stop plate 419 by stud 411. Rotation of the cable drum causes stud 411 to positively pivot the latch lever 584 clockwise against its spring bias. Such action removes the latch hook plate 585 from above the sensing lever post 576 permitting the sensing lever 571 to resume its normal position in preparation for the next cycle of printer operation. This release of the sensing lever 571 also releases the ratchet wheel stop pawl 412 permitting it to engage ratchet wheel 410 and normal spacing operation can resume.

Provision is made to manually line return by depressing a button 592. Depression of button 592, through a wire link rod 593, moves the sensing lever post 576 down past the latch hook plate 585. This movement pivots the feed pawl 493 counterclockwise into engagement with and releasing the ratchet stop pawl 412 to permit the cable drum 393 to rotate under force of its coil spring 495 back to start-of-line position. The ratchet stop pawl 412 and sensing lever 571 are reset in the manner described above when the start-of-line position is reached.

*Automatic Line Feed-Line Return* will occur whenever the printer is spaced to the end-of-line position. At such position the cable drum ratchet wheel stud 411 comes up under a lug 595 (FIGURES 11 and 17) on one arm of an automatic line feed-line return lever 596 journalled on a stud 597 fixed on the outside of support plate 205.

Lever 596 is biased clockwise by a spring 598 to a limit position determined by abutment of a depending lever finger 599 with a post 600 fixed in support plate 205. The forward end of lever 596 has a rounded nub 601 which is disposed in a notched recess 602 in the line feed-line return sensing cam 220 in sensing cam assembly 215. This cam 220 is the only cam in the sensing cam assembly 215 that is freely journalled relative to the typewheel shaft 212. The normal spring biased position of lever 596 will maintain the sensing cam 220, as illustrated in FIGURE 37. However, if the cable drum assembly 492 is at the end of line position and its stud 411 has engaged the lug 595 on lever 596, lever 596 is pivoted counterclockwise, placing the two fingers 603 and 604 of the line feed-line return sensing cam 220 into blocking position under respective sensing fingers 559 and 574 of the line feed and line return sensing lever assemblies. In such a position the next printer cycle will operate a line feed function and a line return function in the manner previously described in the sub-sections devoted to line feed and line return.

Note, the cam segment 406 in the cable drum 493 actuates an end of line switch S–804 approximately six spaces before the end of line is reached. This action energizes a circuit to the "END-LINE" lamp I–702 on the keyboard unit 50.

*Printer Selection Matrices.*—Along the rear edge of base plate 201 (FIGURE 9) two matrix boxes 606 and 607 are fastened by screws. The left-hand box 606 contains the "space" matrix CR801 and CR802, while the right-hand box 607 contains the "mark" matrix CR803 and CR804, see FIGURE 3 for the specific matrix circuits. All diodes and resistors of the "space" matrix and those of the "mark" matrix are molded in a solid compound, e.g., phenolic resin, inside the respective boxes 606 and 607 with external terminals 608 projecting from the tops of the boxes. FIGURE 9 illustrates the matrix boxes 606 and 607 with exterior connections removed.

In FIGURE 12, a plug-in connector 610 is illustrated on top of the "space" matrix box 606, a similar plug-in connector cooperating with the "mark" matrix box 607. Eight lines from each matrix box 606 and 607 are separately bundled as indicated by 611 and 612 and lead to tip jacks 613 that plug in the sets of eight terminals A, B, C, D, E, F, G and H and A′, B′, C′, D′, E′, F′, G′ and H′ of the "space" commutator S–801 and the "mark" commutator S–802 respectively. Leads from the "space" and "mark" matrices, the motor B–801, the "space" and "mark" solenoids E–801 and E–802, the transfer solenoid E–803, switches S–803, S–804 and S–805, the illumination lights I–801 and the "Receive" and "Transmit" signal lamps I–802 and I–803 pass into a cable 615 having a plug socket J–801 on its end for connection to the control circuit.

The printer page illumination may be accomplished by any appropriate means, a simple arrangement of two lamps I–801 being shown in FIGURE 9 wherein lamp sockets 616 are secured to the inside front edge of support plates 203 and 205.

Illustrated by solid lines in FIGURE 9 and phantom lines in FIGURE 10, the transmit signal lamp I–803 and the receive signal lamp I–802 are identical except for their legends, hence only one will be described. Both signal assemblies are mounted on the printer base plate 201 along the front edge. Each assembly consists of a plastic face plate 618 covered with opaque material and shock mounted by bolts 619, spacers 620 and rubber washers 621 to an angle bracket 622 secured to base plate 201. Centrally located on the upper flange of bracket 622 is a midget lamp base 623 consisting of a flanged socket 624, a rubber lamp shield 625, two insulators 626, a terminal 627, lock-washer 628 and nut 629. A second terminal 630 projects from socket 624. A midget lamp 631 is threaded into the socket 624 compressing a rubber shield 632 against the face plate 618. Leads from the signal assemblies pass into cable 615 and socket 616 for connection in the control circuit.

*General printer operation*

The printer power source is controlled by the main control circuit and when it is on, the printer motor B–801 is operating.

A five unit Baudot code signal combination is fed simultaneously into the control circuit as previously described. Any five unit signal having a spacing impulse as the first unit results in the next four signal impulses being fed to the "space" matrix CR–801 and CR–802. Dependent on the permutative arrangement of the four "mark" and/or "space" impulses the "space" matrix will cause a control circuit to be selected, including two of eight leads which connect to the eight terminals A, B, C, D, E, F, G and H on the "space" commutator S–801. The two selected leads are connected to inner and outer commutator segments and will be connected by the commutator rotor brushes 307 and 308 bridging the inner and outer two selected segments of the commutator at one of sixteen angular positions of the rotor 302. As soon as the commutator rotor reaches the selected segments and makes the selected contact between the two leads, the circuit controlled by those matrix leads will energize the "space" solenoid E–801 and hold the preset space pawl 258 in engagement with a specific tooth of a sixteen tooth stop wheel 254 fixed on the typewheel shaft 212. At the speed of operation of this printer the rotor brushes 307 and 308 contact each possible pair of commutator segments for five milli-seconds, which is more than the two milli-seconds required for the control circuit to actuate the appropriate pawl solenoid after the rotor brushes first contact the selected commutator segments. Similarly, the "mark" matrix is set up and operated if the first impulse of a five unit code signal is a "mark" impulse. The "mark" pawl 259 engages a tooth and stops the stop wheel 254 at positions intermediate those of the space pawl 258 thereby enabling 32 distinct stop positions for the typewheel shaft.

Immediately after the proper matrix is selected by receipt of the five unit code, a signal is sent, through the control circuit, to the printer transfer solenoid E–803, actuating the clutch stop bracket 466 to engage the positive clutch assembly. Constantly rotating motor B–801 then drives the function shaft 360° before the clutch kickout plate 453 disengages the positive clutch. During the first 252° of function shaft rotation the typewheel shaft 212 will, if permitted, be rotated 360° through a friction clutch 371. At one point during the typewheel shaft rotation either the "space" or "mark" commutator rotor 302 or 303 will bridge a set of selected segment to immediately energize a respective solenoid and hold a stop pawl in engagement with the typewheel shaft stop wheel 254. That selected stop position holds the typewheel 237 with the selected character, corresponding to the received signal, in position to be printed on the recording paper.

After the typewheel is positioned by a stop pawl, the friction clutch slips while the function shaft 363 continues rotation through its final angle of rotation. At approximately 275° of rotation the print hammer shaft 314 is actuated to cause the hammer head 324 to strike the recording paper against the selected typewheel character and break the light surface revealing the dark surface of the paper as a visual character manifestation. Shortly thereafter the spacing mechanism actuates feed pawl 412 to rotate the cable drum 393 and shift the typewheel assembly and print hammer lever one character space. The line feed and line return lever assemblies are also actuated but no associated function will result unless their sensing pins 559 and 574 are blocked by a sensing cam assembly 215 rotatably with and positioned in accord with typewheel selection. Thus, if the typewheel is positioned to represent a line feed or line return signal, appropriate fingers on the blocking cam assembly block sensing pins on the line feed or line return lever assemblies to cause operation of the specific functions. Line feed always occurs whenever a line return signal is received. The sensing cam assembly includes a print hammer blocking cam that coacts with a print hammer blocking lever 327 to prevent hammer impact if a blank space is presented by the typewheel selection. Automatic line feed-line return occurs when the cable drum rotates to the end-of-line position and is actuated through the sensing cam assembly 215 in which one cam shifts to block both the line feed and line return sensing pins causing both functions to operate. Manual line return can be accomplished and operates through a portion of the line return lever system.

Through a cam 374 on the function shaft 360 two stop sensing switches S–803 and S–805 are actuated when the printer reaches the stop position, where the positive clutch is automatically disengaged. These switches prevent the next signal from being fed to the control circuit until the preceding signal is printed and the printer is cleared. Their precise control function is described hereinbefore in the section devoted to the control circuit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination, a printing unit having a rotatable typewheel selectively positionable for imprinting a series of characters, a plural electrical channel input to said printer for receiving multiple unit code signal combinations indicative of characters to be printed, means controlled by the permutative energization of said channels for positioning said typewheel with the character thereof corresponding to the character represented by the permutative energization of said channels in printing position, and means for energizing said channels comprising a keyboard and a plurality of keyboard actuated switches permutatively actuated upon depression of a key to control permutative energization of said channels.

2. In combination, a printing unit having a rotatable typewheel selectively positionable for imprinting a series of characters, a plurality of pairs of electrical channels equal in number to the number of units of a multiple unit code group utilized, a plurality of relays equal in number to the number of pairs of channels and each associated with one of said pairs of channels and operative to ground the channels of such associated pair alternatively, means for permutatively energizing said plurality of relays indicative of a unit of data, and means operative under control of the ground connections to said channels for positioning said rotatable typewheel in accordance with the significance of the unit of data indicated by the energization of said relays.

3. In combination, a printing member movable through a series of positions in which a series of characters are moved through a printing position, means for producing a series of simultaneously occurring signals indicative of a permutative group of characters to be selected for printing, means for sensing the permutations of simultaneous signals produced by said signal producing means and for producing a signal in distinct timed relation to the movement of said printing member for each permutation of simultaneous signals produced by the first said signal producing means, and means responsive to a signal from the second of said signal pronducing means for arresting the movement of said printing member.

4. Communication equipment comprising a typewheel type page printer, a plurality of pairs of data transmission channels, means for permutatively applying simultaneous signals to one channel of each of said plurality of pairs of channels to produce a coded signal indicative of a unit of data, and means connected to each of said channels and responsive to the signal applied thereto for controlling the operation of said typewheel type page printer in accordance with the significance of the unit of data indicated by the applied signal.

5. A teletypewriter unit comprising a rotatable function operating mechanism having a rotatable power shaft; control means to initiate rotation of said power shaft and to stop rotation after a predetermined increment of rotation; selecting means connected with said function mechanism and operable through a position cycle to a plurality of distinct positions, each indicative of a specific timed signal; a timing device, operatively connected and positioned in synchronism with the cycle position of said selector mechanism and connected to a signal transmission device, for coordinating said signal with its synchronized position and stopping said selecting means at the position indicative of a specific received signal.

6. In a teletypewriter printer: a selecting mechanism comprising a rotatable shaft having a plurality of angular stop positions indicative of character representations and printer function operations; means for frictionally driving said shaft; wheel means, including a multiple toothed stop wheel, fixed on said shaft; solenoid controlled pawl means disposed for cooperation with said stop wheel teeth whereby movement of said pawl means into engagement with a tooth of said wheel will stop shaft rotation; commutator means disposed adjacent said shaft including a plurality of control circuits and a brush connected for synchronous rotation with said shaft means for feeding a predetermined signal timed with rotation of said shaft into a selected one of said plurality of control circuits, said control circuits being connected to operate said solenoid actuated means, and each control circuit corresponds to a specific coded signal combination; whereby upon rotation of said shaft to a position where said brush coacts with said one control circuit as set up by said received coded signal combination, said solenoid controlled pawl means controls said stop wheel to stop the shaft at a position indicative of the character or function represented by said coded signal combination.

7. A selecting mechanism as set forth in claim 6, wherein said solenoid controlled pawl means comprises at least two solenoids and two pawls, the stop wheel engaging edges of said pawls being disposed so one pawl will engage said stop wheel teeth and stop said shaft at positions intermediate to the stop positions corresponding to the other of said pawls whereby the number of distinct stopping positions of said shaft is equal to the number of teeth on said stop wheel multiplied by the number of pawls.

8. A selecting mechanism as set forth in claim 7, wherein said commutator means includes a plurality of brush devices and a plurality of control circuits, a portion of said control circuits being associated with each solenoid and a brush device associated with each portion of control circuits.

9. A selecting mechanism as set forth in claim 6, wherein said wheel means comprises: said stop wheel and a camming wheel, said camming wheel having teeth oppositely inclined to those of said stop wheel; and said pawl means are spring biased and include a stop edge and a cam follower edge, the latter being biased to engage and ratchet over the teeth of said camming wheel whereby the stop edge is positively placed in a position that would engage the teeth of said stop wheel if retained in such position, the teeth of said camming wheel and said stop wheel being related relative to said pawl edges to permit spring biased removal of the pawl stop edge from a stop wheel engaging position prior to engagement by said stop wheel teeth, and said solenoid holds said pawl in its cam actuated stop position whenever it is energized.

10. In a teletypewriter printer: a selecting mechanism comprising a single rotatable member having a plurality of angular stop positions indicative of characters to be printed and printer operations to be performed; means for frictionally driving said rotatable member; means cooperating with said rotatable member rendering printer functions operable; and means, including a device rotatable in direct ratio with said rotatable member, capable of stopping said rotation of said rotatable member at any of a plurality of predetermined positions, said means being rendered operable at specific angular positions of said rotatable member, after receipt of predetermined code signal combinations, by coordination of said received code signal with the angular position of said rotatable device.

11. A teletypewriter page printer comprising a rotatable typewheel shaft, a typewheel mounted on said shaft for rotation with said shaft and slidable axially thereon; a pivotable print hammer shaft disposed parallel to said typewheel shaft; a print hammer fixed for pivotal movement with said print hammer shaft and axially movable thereon; a cable rigging including at least two stretches of cable substantially parallel with said shafts and shiftable in the same direction upon shifting of said cable; means connecting said typewheel and print hammer to respective ones of said two stretches; means for incrementally shifting said cable in one direction to simultaneously shift said typewheel and print hammer in synchronism step by step from one side of the page printer to the other side; and means for shifting said cable in the opposite direction to shift said typewheel and print hammer back to said one side.

12. A teletypewriter page printer comprising: a selector mechanism including a rotatable selecting shaft; a typewheel mounted on said shaft for rotation with said shaft and slidable axially thereon; a pivotable print hammer shaft disposed parallel to said selecting shaft; a print hammer fixed for pivotal movement with said print hammer shaft and axially movable thereon; means for pivoting said print hammer shaft to initiate a print operation; a cable rigging including at least two stretches of cable substantially parallel with said shafts and shiftable in the same direction upon shifting of said cable; means connecting said typewheel and print hammer to respective ones of said two stretches; means for incrementally shifting said cable to simultaneously shift said typewheel and print hammer in synchronism, step by step from one side of the page printer to the other side; and means for shifting said cable in the opopsite direction to shift said typewheel and print hammer back to said one side; said selecting means being controlled by the typewheel shaft position and including stop means for stopping said typewheel shaft at any of a plurality of angular positions.

13. A teletypewriter printer as defined in claim 12, wherein means are fastened to said selecting shaft for rotation therewith and to said print hammer shaft for pivotal movement therewith adapted to interengage upon initiation of each printing operation to provide means for preventing completion of a print function whenever said selecting shaft is in a predetermined angular position.

14. A teletypewriter page printer as defined in claim 12, wherein said hammer is positioned in front of the typewheel and a pressure sensitive record page is disposed for feeding between the hammer and typewheel; the record page surface facing said hammer having a special surface treatment whereby pressure exerted on said record page by impact of said hammer on the record page against a character representation on said typewheel will create a change in the surface texture of said record page corresponding to said character representation.

15. A teletypewriter page printer as defined in claim 13, wherein said means for preventing completion of a printing operation comprises a sensing cam fixed for rotation with said selecting wheel and a print hammer blocking lever fixed for pivotal movement with said print hammer shaft and operatively disposed relative to said sensing cam for engagement with said sensing cam after initiation of each printing operation, said sensing cam having blocking portions engaged by said blocking lever and preventing full pivotal movement of said print hammer shaft at predetermined angular positions of said selecting shaft.

16. A teletypewriter unit comprising a rotatable function operating mechanism having a rotatable power shaft; control means to initiate rotation of said power shaft and to cause rotation to cease after a predetermined increment of rotation; selecting means power connected through a slippable connection with said function mechanism and comprising a rotatable selecting shaft having a plurality of stop positions, a multiple toothed stop wheel fixed on said selecting shaft, solenoid controlled pawl means disposed for cooperation with said stop wheel whereby movement of said pawl means into engagement with a tooth of said stop wheel will stop selecting shaft rotation, a commutator including a plurality of control circuits corresponding to code signals disposed adjacent said selecting shaft and a brush rotatable in synchronism with said selector shaft for completing a predetermined one of said plurality of control circuits in said commutator, said control circuits being connected to operate said solenoid controlled means; and said one control circuit being completed upon rotation of said brush shaft to a position corresponding to a selecting shaft position indicative of the character or function represented by said coded signal combination.

17. A teletypewriter comprising a rotatable function shaft; a selecting shaft; means enabling said selecting shaft to be frictionally rotated by said function shaft; means for initiating function shaft rotation and stopping rotation after a predetermined angular rotation; means controlled by selecting shaft angular position for selectively stopping rotation of said selecting shaft at any one of a plurality of distinct angular positions corresponding to a plurality of respective code signals within an initial increment of said function shaft predetermined angular rotation; and means engaging said function shaft for furnishing power to accomplish printer functions during function shaft rotation after said initial increment.

18. A teletypewriter as defined in claim 17, wherein the means engaging said function shaft for accomplishing power operation printer functions includes shiftable linkage means for at least actuating printing, line feed and line return functions, and said selecting shaft includes means fixed thereto for engagement by said shiftable linkage means to enable operation of at least the printing, line feed and line return functions.

19. A positive clutch for use in the power train of a teletypewriter comprising: coaxial driving and driven units; a set of unit engaging devices disposed at diametral positions adjacent both of said units; means pivoting each device at one end at diametral positions on the driven unit; a resilient means connected between the pivoted end of each device and the other end of the other device to bias said devices towards engagement with the driving unit; a member engaging said device pivot means for limited coaxial movement relative to said driven unit and including a camming means coacting with the other ends of said devices to pivot said devices out of engagement with said driving unit against the bias of said resilient means upon rotation of said member relative to said driven unit; and means for rotating said member relative to said driven unit.

20. In a teletypeprinter selecting mechanism: a rotatable selecting member; a brush rotatable with said member; a communtator engaged by said brush and including a plurality of contact segements disposed in sets adapted to be sequentially bridged by said brush as said brush is rotated; a plurality of terminals, less in number than said plurality of contact segments, each terminal being connected to a predetermined number of said contact segments less than all of said plurality of contact segments; a matrix control circuit for receiving a coded combination of simultaneous signals, impressing a source of potential on selected ones of said terminals and including means to stop said rotatable member at a position where said brush bridges the contact segments connected with said selected terminals, thereby completing the circuit for said potential source.

21. A selecting mechanism as defined in claim 20, wherein said commutator comprises a plate having printed commutator segments and circuits thereon connected to said terminals.

References Cited by the Examiner

UNITED STATES PATENTS

| | | | |
|---|---|---|---|
| 1,107,365 | 8/14 | Scribner et al. | 178—324 |
| 2,233,667 | 3/41 | Krum | 178—32 |
| 2,406,835 | 9/46 | Herbst | 178—32 |
| 2,668,870 | 2/54 | Ridler | 178—34 |
| 2,718,633 | 9/55 | Fennessy | 340—345 |
| 2,847,503 | 8/58 | Diammond et al. | 340—347 X |

NEIL C. READ, *Primary Examiner.*

WILLIAM C. COPPER, *Examiner.*